US012323369B2

(12) United States Patent
Sun et al.

(10) Patent No.: US 12,323,369 B2
(45) Date of Patent: Jun. 3, 2025

(54) SEARCH SPACE ALIGNMENT FOR CONTROL CHANNEL MONITORING

(71) Applicant: QUALCOMM Incorporated, San Diego, CA (US)

(72) Inventors: Jing Sun, San Diego, CA (US); Tao Luo, San Diego, CA (US); Xiaoxia Zhang, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 17/662,030

(22) Filed: May 4, 2022

(65) Prior Publication Data

US 2022/0360420 A1     Nov. 10, 2022

Related U.S. Application Data

(60) Provisional application No. 63/186,597, filed on May 10, 2021.

(51) Int. Cl.
*H04W 72/04*        (2023.01)
*H04L 5/00*         (2006.01)
*H04W 28/02*        (2009.01)
*H04W 72/044*      (2023.01)
*H04W 72/0453*     (2023.01)
*H04W 72/542*      (2023.01)

(52) U.S. Cl.
CPC ....... *H04L 5/0098* (2013.01); *H04W 28/0236* (2013.01); *H04W 72/0453* (2013.01); *H04W 72/046* (2013.01); *H04W 72/542* (2023.01)

(58) Field of Classification Search
CPC ............... H04L 5/0098; H04L 5/0053; H04W 28/0236; H04W 72/0453; H04W 72/046; H04W 72/542
See application file for complete search history.

(56) References Cited

U.S. PATENT DOCUMENTS

| | | | |
|---|---|---|---|
| 2019/0222357 A1* | 7/2019 | Huang | H04L 5/0094 |
| 2020/0045569 A1* | 2/2020 | Seo | H04W 72/23 |
| 2021/0314927 A1* | 10/2021 | Noh | H04W 72/56 |
| 2021/0385800 A1* | 12/2021 | Harada | H04W 68/02 |
| 2022/0038919 A1* | 2/2022 | Wang | H04L 5/0053 |
| 2022/0131672 A1* | 4/2022 | Jang | H04L 1/08 |
| 2023/0354364 A1* | 11/2023 | Guo | H04W 52/0229 |
| 2024/0214954 A1* | 6/2024 | Lim | H04W 52/40 |

FOREIGN PATENT DOCUMENTS

WO    WO-2021205384 A1 * 10/2021

* cited by examiner

*Primary Examiner* — Romani Ohri
(74) *Attorney, Agent, or Firm* — QUALCOMM Incorporated

(57) ABSTRACT

Certain aspects of the present disclosure provide techniques for search space alignment for control channel monitoring. A method that may be performed by a user equipment (UE) includes aligning a first set of monitoring occasions associated with a common search space (CSS) with a second set of monitoring occasions associated with a UE-specific search space (USS). The method further includes monitoring for signals from a network entity via at least one of the CSS or the USS in the aligned first and second set of monitoring occasions. The method also includes communicating with a network entity based on reception of at least one of the signals in the aligned first and second set of monitoring occasions.

30 Claims, 12 Drawing Sheets

SEARCH SPACE ALIGNMENT FOR CONTROL CHANNEL MONITORING

CROSS-REFERENCE TO RELATED APPLICATION(S)

The present Application for Patent claims priority to U.S. Provisional Application No. 63/186,597, filed May 10, 2021, which is hereby expressly incorporated by reference herein in its entirety.

BACKGROUND

Field of the Disclosure

Aspects of the present disclosure relate to wireless communications, and more particularly, to techniques for control channel monitoring.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide downlink signaling at high frequencies of millimeter wave bands, desirable power consumption for monitoring downlink signaling, and/or dynamic configuration of a monitoring schedule for downlink signaling that is in compliance with the monitoring capabilities of a user equipment.

Certain aspects of the subject matter described in this disclosure can be implemented in a method for wireless communication by a user equipment (UE). The method generally includes aligning a first set of monitoring occasions associated with a common search space (CSS) with a second set of monitoring occasions associated with a UE-specific search space (USS). The method further includes monitoring for signals from a network entity via at least one of the CSS or the USS in the aligned first and second set of monitoring occasions. The method also includes communicating with a network entity based on reception of at least one of the signals in the aligned first and second set of monitoring occasions.

Certain aspects of the subject matter described in this disclosure can be implemented in a method for wireless communication by a network entity. The method generally includes aligning a first set of monitoring occasions associated with a CSS with a second set of monitoring occasions associated with a USS. The method also includes transmitting one or more signals via at least one of the CSS or the USS in the aligned first and second set of monitoring occasions. The method further includes communicating with a UE based on at least one of the signals in the aligned first and second set of monitoring occasions.

Certain aspects of the subject matter described in this disclosure can be implemented in an apparatus for wireless communication. The apparatus generally includes a memory and a processor coupled to the memory. The memory comprises executable instructions. The processor is configured to execute the executable instructions and cause the apparatus to: align a first set of monitoring occasions associated with a common search space (CSS) with a second set of monitoring occasions associated with a UE-specific search space (USS), monitor for signals from a network entity via at least one of the CSS or the USS in the aligned first and second set of monitoring occasions, and communicate with a network entity based on reception of at least one of the signals in the aligned first and second set of monitoring occasions.

Certain aspects of the subject matter described in this disclosure can be implemented in an apparatus for wireless communication. The apparatus generally includes a memory and a processor coupled to the memory. The memory comprises executable instructions. The processor is configured to execute the executable instructions and cause the apparatus to: a memory comprising executable instructions; and a processor coupled to the memory, the processor being configured to execute the executable instructions and cause the apparatus to: align a first set of monitoring occasions associated with a common search space (CSS) with a second set of monitoring occasions associated with a user equipment (UE)-specific search space (USS), transmit one or more signals via at least one of the CSS or the USS in the aligned first and second set of monitoring occasions, and communicate with a UE based on at least one of the signals in the aligned first and second set of monitoring occasions.

Certain aspects of the subject matter described in this disclosure can be implemented in an apparatus for wireless communication. The apparatus generally includes means for aligning a first set of monitoring occasions associated with a common search space (CSS) with a second set of monitoring occasions associated with a UE-specific search space (USS); means for monitoring for signals from a network entity via at least one of the CSS or the USS in the aligned first and second set of monitoring occasions; and means for communicating with a network entity based on reception of at least one of the signals in the aligned first and second set of monitoring occasions.

Certain aspects of the subject matter described in this disclosure can be implemented in an apparatus for wireless communication. The apparatus generally includes means for aligning a first set of monitoring occasions associated with a common search space (CSS) with a second set of monitoring occasions associated with a user equipment (UE)-specific search space (USS); means for transmitting one or more signals via at least one of the CSS or the USS in the aligned first and second set of monitoring occasions; and means for communicating with a UE based on at least one of the signals in the aligned first and second set of monitoring occasions.

Certain aspects of the subject matter described in this disclosure can be implemented in a computer-readable medium having instructions stored thereon for aligning a first set of monitoring occasions associated with a common search space (CSS) with a second set of monitoring occasions associated with a UE-specific search space (USS); monitoring for signals from a network entity via at least one of the CSS or the USS in the aligned first and second set of monitoring occasions; and communicating with a network entity based on reception of at least one of the signals in the aligned first and second set of monitoring occasions.

Certain aspects of the subject matter described in this disclosure can be implemented in a computer-readable medium having instructions stored thereon for aligning a first set of monitoring occasions associated with a common search space (CSS) with a second set of monitoring occasions associated with a user equipment (UE)-specific search space (USS); transmitting one or more signals via at least one of the CSS or the USS in the aligned first and second set of monitoring occasions; and communicating with a UE based on at least one of the signals in the aligned first and second set of monitoring occasions.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
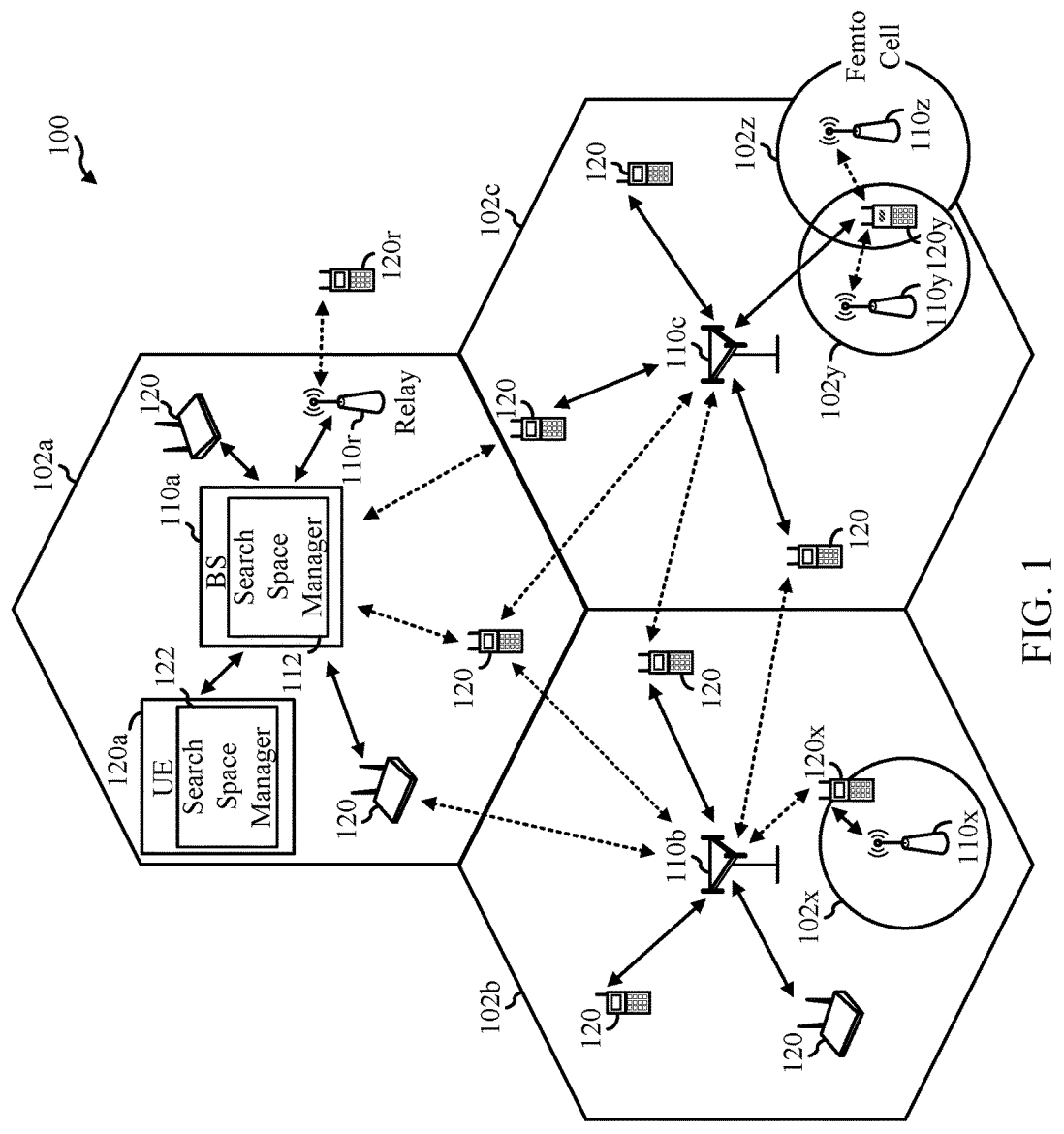
FIG. 1 is a block diagram conceptually illustrating an example wireless communication network, in accordance with certain aspects of the present disclosure.
Figure 1:
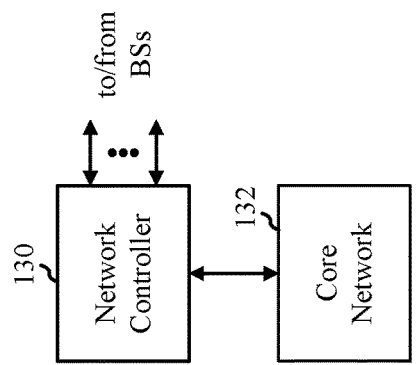

Aspects of the present disclosure provide apparatus, methods, processing systems, and computer readable mediums for aligning search spaces for control channel monitoring.

In certain wireless communication systems (e.g., Evolved Universal Terrestrial Radio Access (E-UTRA)), a physical downlink control channel (PDCCH) is allocated across an entire system bandwidth, whereas a PDCCH in New Radio (NR) wireless systems is transmitted in the control resource sets (CORESETs) of an active bandwidth part (BWP). In a CORESET, the set of resource blocks (RBs) and the number of consecutive OFDM symbols in which the CORESET is located are configurable, and the time domain locations of the OFDM symbols are configurable with corresponding PDCCH search space (SS) set(s). A search space set may be configured with a specific type (e.g., common search space (CSS) set or a user equipment (UE)-specific search space (USS) set), a DCI format to be monitored, a monitoring occasion, and the number of PDCCH candidates for each aggregation level (AL) in the SS set. In other words, a search space set is a set of one or more search spaces, where each search space corresponds to an AL (e.g., the number of control channel elements for a PDCCH candidate).

In NR systems, frequency bands higher than FR2 may be supported, such as frequency bands in 52.6 GHz to 71 GHz. Such high frequency bands may use specific subcarrier spacing (SCSs), which may result in the duration of a slot being shorter than lower frequency bands. For such short slot durations, a UE may support multi-slot PDCCH monitoring to avoid excessive power consumption (e.g., shorter battery life) in monitoring and/or design complexities to achieve monitoring at such high rates. In other words, instead of monitoring the PDCCH in every slot, the UE may monitor the PDCCH every N slots or in non-consecutive slots.

In certain cases, the CSS and/or USS may not be configured for multi-slot monitoring. The monitoring occasions for the CSS and USS may be arranged in time such that the UE is scheduled to monitor the PDCCH in consecutive slots or in slots arranged too close together for the transceiver architecture. In other words, the UE may monitor the USS and CSS at different locations in time, and some of the monitoring occasions scheduled for the USS and CSS may be arranged in consecutive slots or in slots too close together. In certain cases, the CSS and USS configurations may result in monitoring occasions being arranged in slots too close together for certain UEs. Such an arrangement for monitoring occasions (either in consecutive slots or too close together) may lead to excessive power consumption or rely on a complex transceiver architecture to monitor for control signaling at high SCSs. As a result, the UE may not be able to monitor the PDCCH in the scheduled monitoring occasions due to complexity limitations and/or power consumption limitations.

Aspects of the present disclosure provide apparatus and technique(s) for aligning search spaces for control channel monitoring. For example, a user equipment (UE) may be configured with a common search space (CSS) and a UE-specific search space (USS) that result in monitoring occasions being arranged in consecutive slots, when a multi-slot monitoring schedule would facilitate desirable power consumption and/or comply with the capabilities of the UE. The search space alignment may involve selecting monitoring occasions for the CSS that are aligned with the USS and using those aligned monitoring occasions for control channel monitoring in the CSS. In certain aspects, the alignment between monitoring occasions may be determined at a slot level, within a portion of a slot, or other suitable time windows for determining alignment.

The search space alignment described herein may enable compliance with the capabilities of the UE to monitor the control channel, for example, at a subcarrier spacing of 480 KHz and/or 960 KHz. In certain aspects, the search space alignment described herein may facilitate desirable (e.g., efficient) levels of power consumption for monitoring the PDCCH in the CSS and/or USS.

The following description provides examples of control channel monitoring in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz and/or 52.6 GHz-71 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

In addition, higher frequency bands are currently being explored to extend 5G NR operation beyond 52.6 GHz. For example, three higher operating bands have been identified as frequency range designations FR4a or FR4-1 (52.6 GHz- 71 GHz), FR4 (52.6 GHz-114.25 GHz), and FR5 (114.25 GHz-300 GHz). Each of these higher frequency bands falls within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

As shown in FIG. 1, the BS 110a includes a search space manager 112 that aligns monitoring occasions for a CSS with monitoring occasions for a USS, in accordance with aspects of the present disclosure. The UE 120a includes a search space manager 122 that aligns monitoring occasions for the CSS with monitoring occasions for the USS, in accordance with aspects of the present disclosure.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of B Ss 110 and provide coordination and control for these B Ss 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
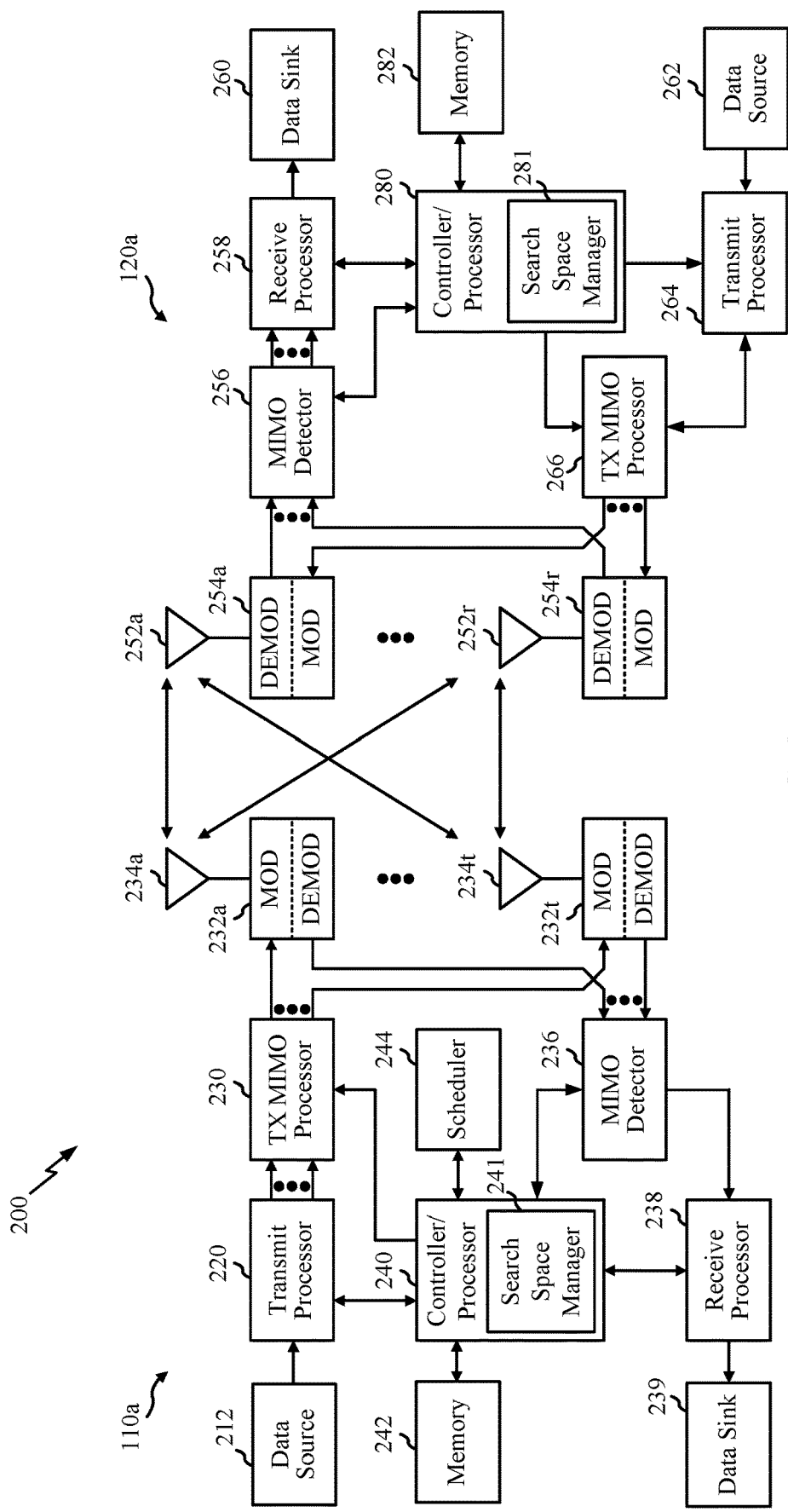
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a search space manager 241 that may be representative of the search space manager 112, according to aspects described herein. As shown in FIG. 2, the controller/processor 280 of the UE 120a has a search space manager 281 that may be representative of the search space manager 122, according to aspects described herein. Although shown at the controller/processor, other components of the UE 120a and BS 110a may be used to perform the operations described herein.

While the UE 120a is described with respect to FIGS. 1 and 2 as communicating with a BS and/or within a network, the UE 120a may be configured to communicate directly with/transmit directly to another UE 120, or with/to another wireless device without relaying communications through a network. In some embodiments, the BS 110a illustrated in FIG. 2 and described above is an example of another UE 120.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
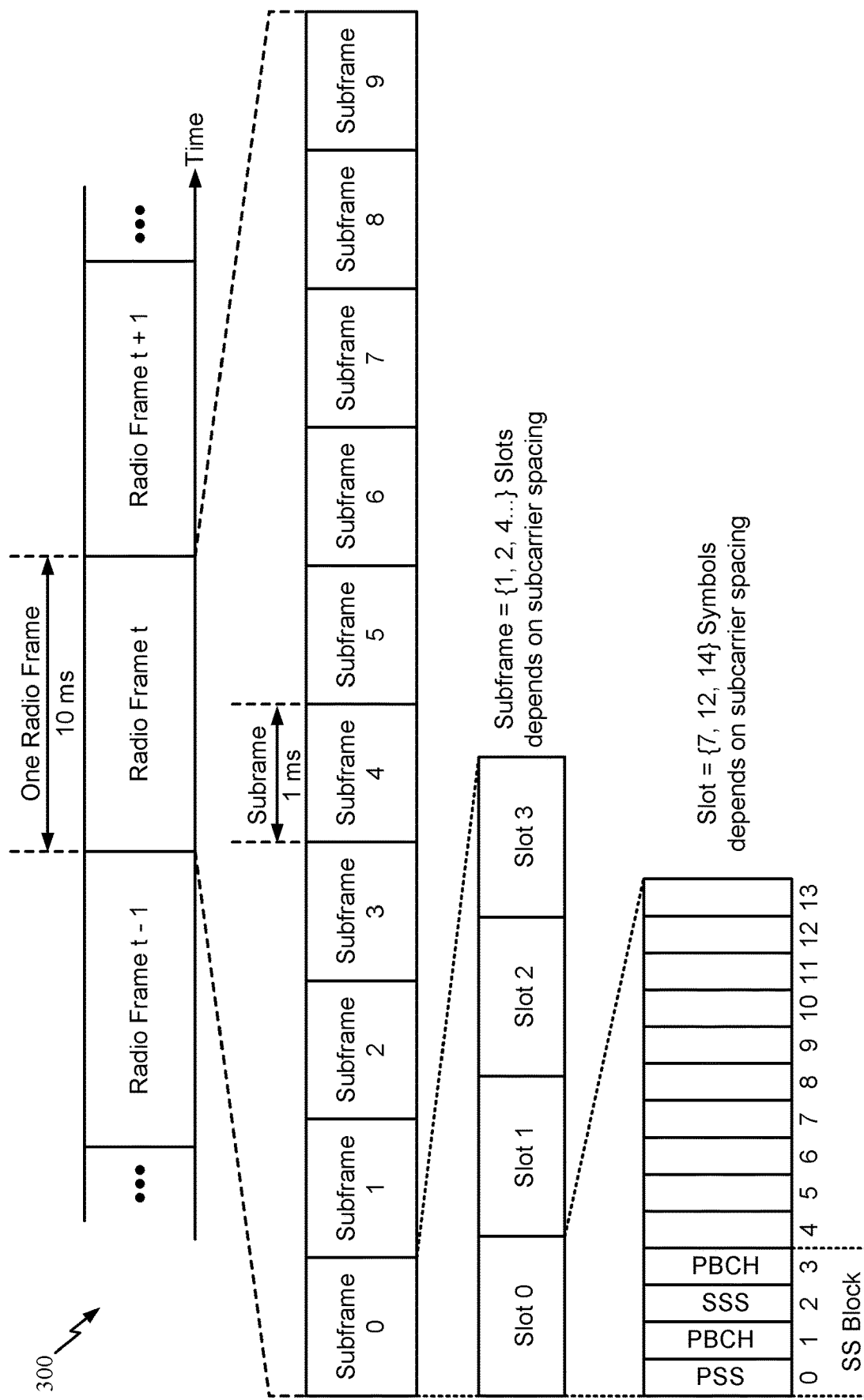
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., downlink (DL), uplink (UL), or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst periodicity, system frame number, etc. The SSBs may be organized into an SS burst to support beam sweeping. Further system information such as, remaining minimum system information (RMSI), system information blocks (SIB s), other system information (OSI) can be transmitted on a physical downlink shared channel (PDSCH) in certain subframes. The SSB can be transmitted up to sixty-four times within an SS burst, for example, with up to sixty-four different beam directions for mmWave. The multiple transmissions of the SSB are referred to as an SS burst in a half radio frame. SSBs in an SS burst may be transmitted in the same frequency region, while SSBs in different SS bursts can be transmitted at different frequency regions.

Figure 4:
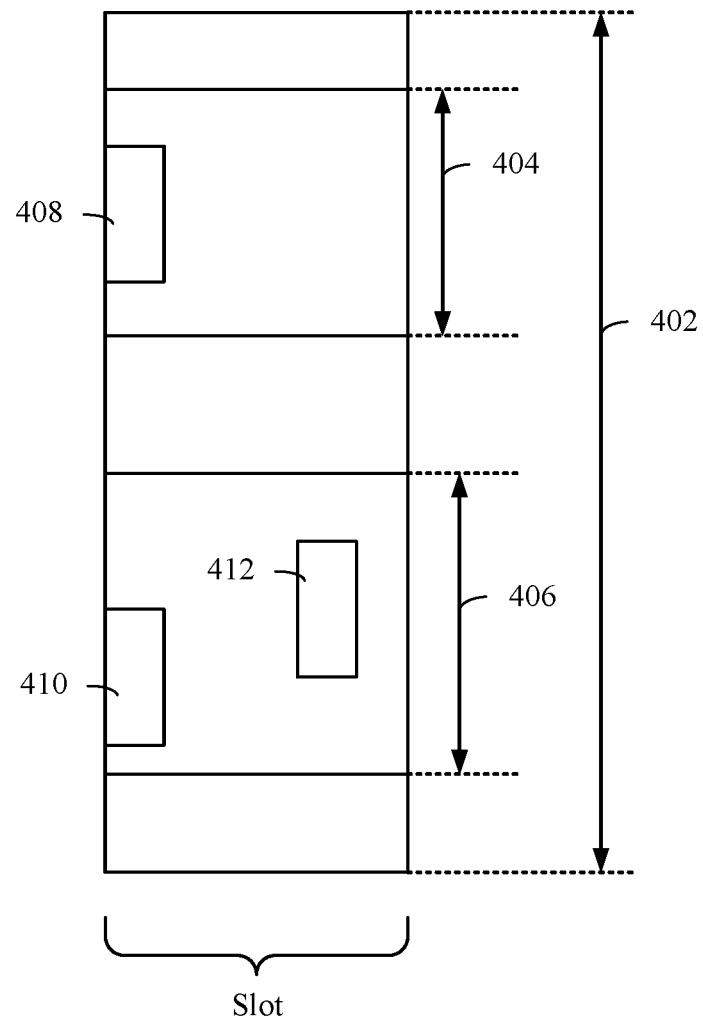
FIG. 4 is a diagram illustrating an example of control resource sets (CORESETs) within a carrier bandwidth across a slot in NR, in accordance with certain aspects of the present disclosure.

In certain wireless communication systems (e.g., LTE), the PDCCH is allocated across an entire system bandwidth, whereas an NR PDCCH is transmitted in the control resource sets (CORESETs) of an active bandwidth part (BWP). FIG. 4 is a diagram illustrating an example of control resource sets (CORESETs) within a carrier bandwidth across a slot in NR. As shown, a carrier bandwidth (CBW) 402 may have multiple bandwidth parts (BWPs) 404, 406 at various subcarrier spacings (SCS). In this example, the BWP 404 is configured with a single CORESET 408. In aspects, a BWP may be configured with multiple CORESETs. For example, the BWP 406 is configured with two CORESETs 410, 412. Each of the CORESETs 408, 410, 412 include a set of physical resources within a specific area in a downlink resource grid and are used, for example, to carry downlink control information (DCI), system information, paging information, and/or random access responses (RARs). In a CORESET, the set of resource blocks (RBs) and the number of consecutive OFDM symbols in which the CORESET is located are configurable with a CORESET configuration, and the time domain location of the OFDM symbols is configurable with corresponding PDCCH search space (SS) set(s). A search space set may be configured with a specific type (e.g., common search space (CSS) set or a UE-specific search space (USS) set), a DCI format to be monitored, a monitoring occasion, and the number of PDCCH candidates for each aggregation level (AL) in the SS set. In other words, a search space set is a set of one or more search spaces, where each search space corresponds to an AL (e.g., the number of control channel elements for a PDCCH candidate). The configuration flexibilities of control regions (e.g., CORESETs and associated search space sets) including time, frequency, numerologies, and operating points enable NR to address a wide range of use cases for control signaling (e.g., various desired latencies and/or various channel conditions).

A specific type of PDCCH may be associated with a specific CSS according to the content of the control signaling carried on the PDCCH. For example, Type 0 may carry system information (e.g., the RMSI) in the master information block (MIB) and SIB1; Type 0A may carry other system information (OSI); Type 1 may carry the random access responses (RAR); Type 2 may carry paging signals; and Type 3 may carry common control signals.

For Type 0A and 2, a set of monitoring occasions are identified for a system information update window (Type 0A) or paging window (Type 2). The set of monitoring occasions for Type 0A and 2 may cycle through SSBs indicated in the system information (ssb-PositionsInBurst in SIB1). As the UE may monitor the PDCCH on a beam associated with a specific SSB, the monitoring occasions for that SSB may be S monitoring occasions apart from each other, where S is the number of SSBs transmitted at a cell.

For Type 1, after a random access channel (RACH) transmission, the UE will monitor Type1-PDCCH in every slot within the RAR window. The UE will use the receive beam that corresponds to downlink SSB associated with the resource of RACH transmission. The CSS is still swept over SSB beams but there is no structure to align the sweeping with a configured USS.

In NR systems, frequency bands higher than FR2 may be supported, such as frequency bands in 52.6 GHz to 71 GHz. Such high frequency bands may use higher SCSs, such as an SCS of 480 KHz and/or 960 KHz. The duration of a slot may be about 31 µs at 480 KHz and about 15 µs at 960 KHz. For such short slot durations, the UE may support multi-slot PDCCH monitoring to avoid excessive power consumption (e.g., shorter battery life) in monitoring and/or design complexities to achieve monitoring at such high rates. In other words, instead of monitoring the PDCCH in every slot, the UE may monitor the PDCCH every N slots (e.g., where N is 4 or 8 slots) or in non-consecutive slots.

In certain cases, the CSS and/or USS may not be configured for multi-slot monitoring. In other cases, the monitoring occasions for the CSS and USS may be arranged in time such that the UE is scheduled to monitor the PDCCH in consecutive slots or in slots arranged too close together for the transceiver architecture. In other words, the UE may monitor the USS and CSS at different locations in time, and some of the monitoring occasions scheduled for the USS and CSS may be arranged in consecutive slots or in slots too close together.

Figure 5:
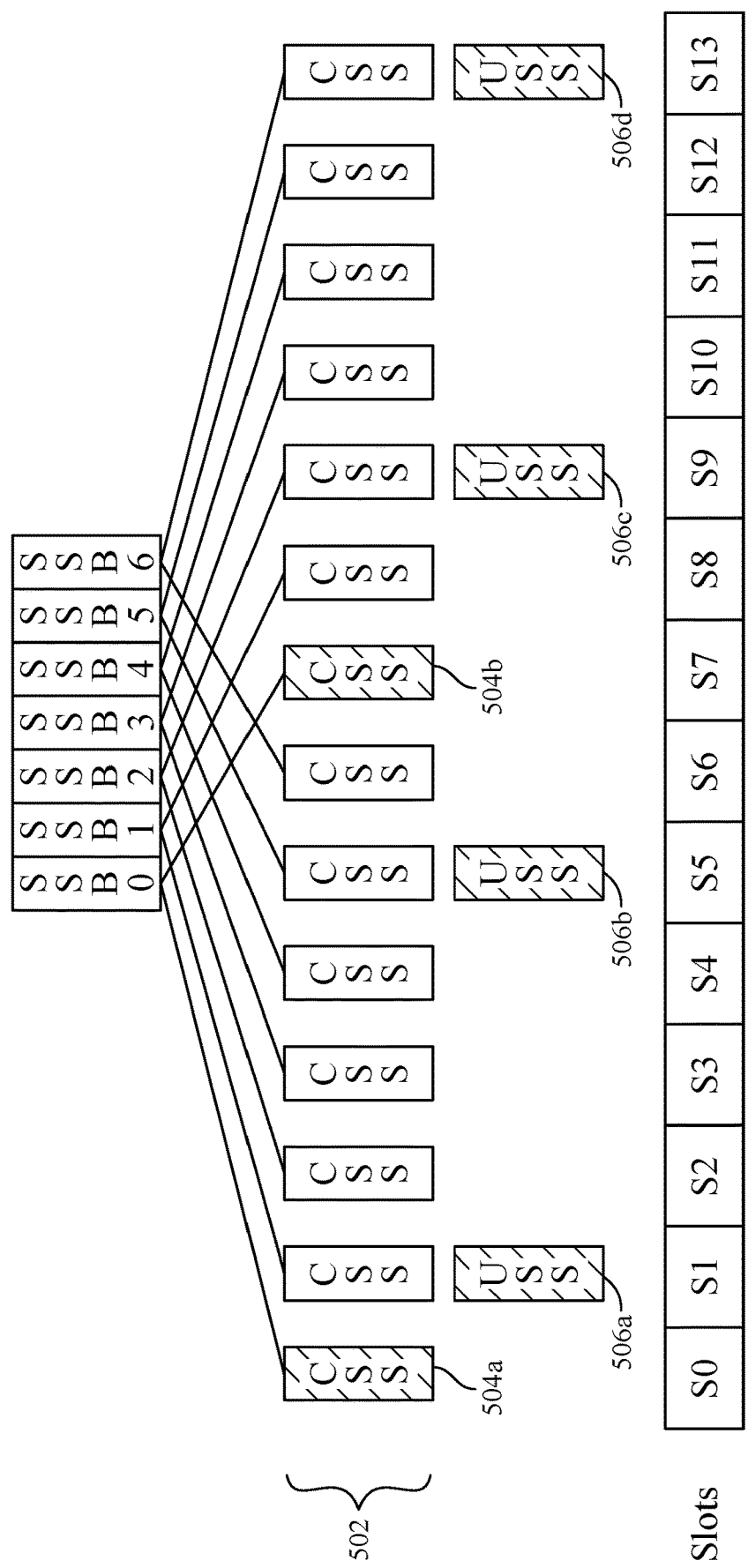
FIG. 5 is a diagram illustrating monitoring occasions for a common search space (CSS) and UE-specific search space (USS) arranged across a sequence of slots, in accordance with certain aspects of the present disclosure.

FIG. 5 is a diagram illustrating monitoring occasions for a CSS and USS arranged across a sequence of slots (S0 through S13), in accordance with certain aspects of the present disclosure. In this example, the UE may be configured with monitoring occasions 502 for the CSS, where each of the monitoring occasions may be associated with a specific SSB among a set of SSBs (e.g., SSB0 through SSB6). The monitoring occasions 502 may be aligned with the locations of the SSBs as provided by the bitmap ssb-PositionsInBurst in SIB1 or in a preconfigure arrangement. In this example, the UE may monitor the PDCCH in monitoring occasions 504a, 504b associated with SSB0, where the monitoring occasions 504a, 504b are arranged in slots S0 and S7, respectively. The UE may also be configured with a USS having monitoring occasions 506a-506d arranged in slots S1, S5, S9, and S13, respectively. The CSS and USS configurations result in the monitoring occasions 504a and 506a being arranged in consecutive slots S0 and S1. In certain cases, the CSS and USS configurations may result in monitoring occasions being arranged in slots too close together for certain UEs such as the monitoring occasions 506b, 504b, 506c being only separated by a single slot.

Such an arrangement for monitoring occasions (either in consecutive slots or too close together) may lead to excessive power consumption or rely on a complex transceiver architecture to monitor for control signaling at high SCSs (e.g., 480 KHz and/or 960 KHz). In certain cases, the UE may not be able to monitor the PDCCH in the schedule monitoring occasions due to complexity limitations or power consumption limitations. Accordingly, what is needed are techniques and apparatus for aligning the CSS and USS monitoring occasions.

Example Search Space Alignment for Control Channel Monitoring

Aspects of the present disclosure provide apparatus and technique(s) for aligning search spaces for control channel monitoring. For example, the UE may be configured with a CSS and USS that result in monitoring occasions being arranged in consecutive slots, when a multi-slot monitoring schedule would facilitate desirable power consumption and/or comply with the capabilities of the UE. The search space alignment may involve selecting monitoring occasions for the CSS that are aligned with the USS and using those aligned monitoring occasions for PDCCH monitoring in the CSS. In aspects, the alignment between monitoring occasions may be determined at a slot level, within a portion of a slot, or other suitable time windows for determining alignment. That is, the monitoring occasions for the CSS and USS may not be fully overlapping at the symbol level, but still be considered to be in alignment. For example, CSS monitoring occasions that are within the same slot(s) as the USS monitoring occasions may be considered aligned with the USS monitoring occasions. The search space alignment described herein may enable compliance with the capabilities of the UE to monitor the PDCCH, for example, at a SCS of 480 KHz and/or 960 KHz. In aspects, the search space alignment described herein may facilitate desirable levels of power consumption for monitoring the PDCCH in the CSS and/or USS.

Figure 6:
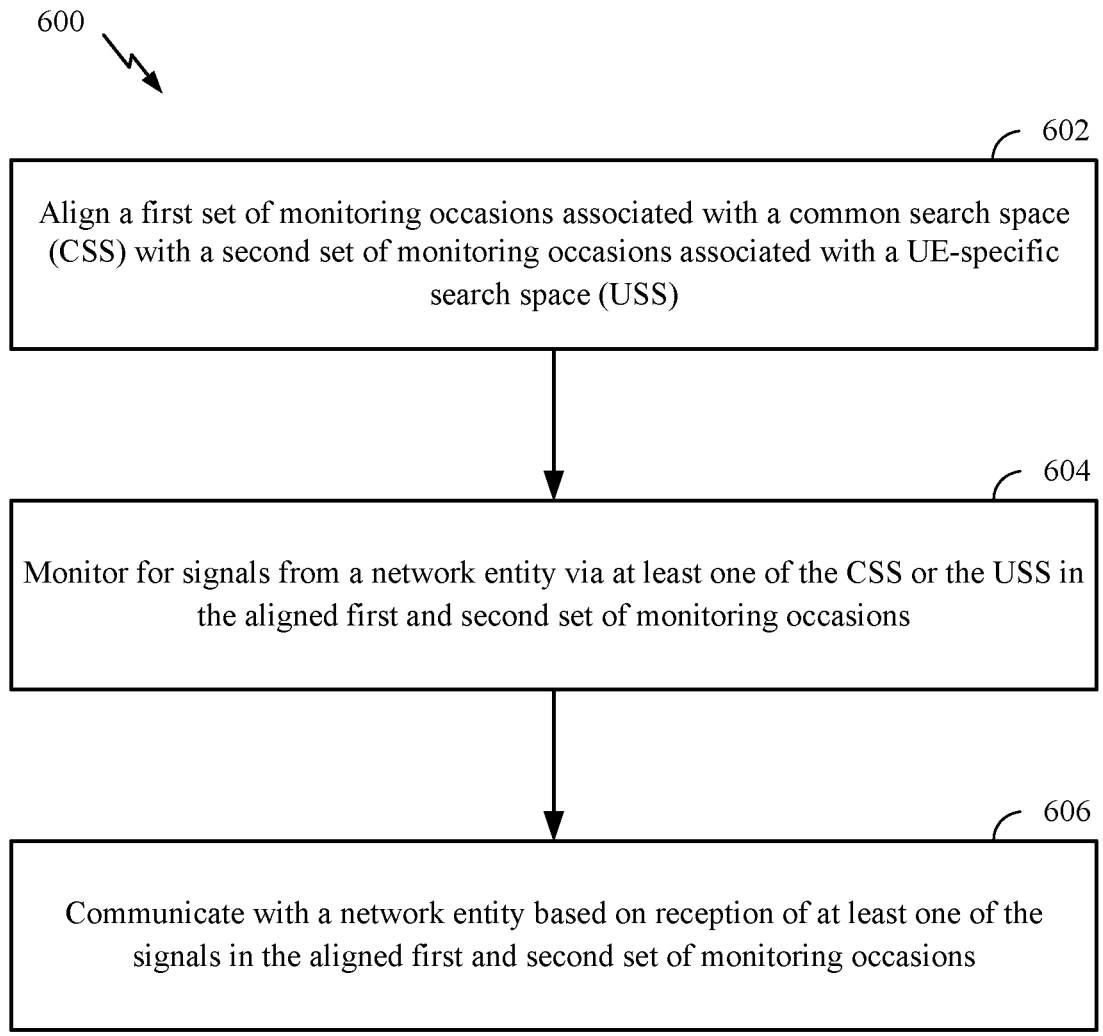
FIG. 6 is a flow diagram illustrating example operations for wireless communication by a UE, in accordance with certain aspects of the present disclosure.

FIG. 6 is a flow diagram illustrating example operations 600 for wireless communication, in accordance with certain aspects of the present disclosure. The operations 600 may be performed, for example, by a UE (such as the UE 120a in the wireless communication network 100). The operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at block 602, where the UE may align a first set of monitoring occasions associated with a CSS with a second set of monitoring occasions associated with a USS. For example, the UE may select one or more monitoring occasions from the first set of monitoring occasions that are aligned with the second set of monitoring occasions, and the UE may use the selected monitoring occasions for monitoring the PDCCH in the CSS. The UE may select the monitoring occasions that are aligned at a slot level (e.g., in the same slot). In certain cases, a CSS monitoring occasion may be considered aligned with a USS monitoring occasion if the monitoring occasions are arranged within the same slot, within a span of symbols (e.g., within a sequence of two or three consecutive symbols in a slot), or within any other suitable time window, for example, as described herein with respect to FIG. 9. In aspects, aligning the CSS and USS monitoring occasions may involve adjusting or adding one or more monitoring occasions associated with the CSS and/or USS to be in alignment with monitoring occasion(s) for the counterpart search space.

At block 604, the UE may monitor for signals from a network entity (e.g., the BS 110) via at least one of the CSS or the USS in the aligned first and second set of monitoring occasions. For example, the UE may monitor for a signal that provides updated system information or a random access response in the CSS monitoring occasions, and the UE may monitor for UE-specific DCI (e.g., user specific scheduling for downlink and/or uplink traffic) in the USS monitoring occasions.

At block 606, the UE may communicate with a network entity based on reception of at least one of the signals in the aligned first and second set of monitoring occasions. For example, the UE may update the system information parameters (such as updated RACH parameters or cell reselection parameters) received in the CSS, and the UE may perform a RACH procedure or cell reselection using the updated parameters. In the case of signaling received in the USS, the UE may receive scheduling for downlink or uplink data transmissions in the USS, and at block 606, the UE may transmit the uplink data or receive the downlink data according to the scheduling received. That is, communicating at block 606 may include the UE performing various operations with system information received at block 604, the UE transmitting a PUSCH payload to the network entity in a RACH procedure based on a RAR received at block 604, and the UE transmitting or receiving data via the resources allocated in DCI received at block 604. Communicating at block 606 may include various transmissions between the UE and network entity in response to at least of one the signals received at block 604.

In certain aspects, the alignment at block 602 may provide the UE with monitoring occasions for the CSS and USS that are arranged within the capabilities of the UE, such as multi-slot monitoring occasions for a SCS of 480 kHz or 960 kHz. For example, the UE may select one or more monitoring occasions from the first set of monitoring occasions that are aligned with the second set of monitoring occasions, such that adjacent monitoring occasions in the selected monitoring occasions are arranged in non-consecutive slots.

In certain cases, the monitoring occasions for the USS or CSS may already be configured as multi-slot monitoring occasions, and the alignment at block 602 may provide the counterpart search space with multi-slot monitoring occasions. That is, adjacent monitoring occasions in the first or second set of monitoring occasions may be arranged in non-consecutive slots. As an example, suppose the UE is configured with multi-slot monitoring occasions in the USS. The alignment at block 602 may enable the UE to conform the CSS monitoring occasions to the multi-slot monitoring occasion of the USS.

For certain aspects, the UE may perform the alignment at block 602 for search spaces using certain SCSs. For example, the UE may perform the alignment at block 602 for one or more SCSs used in the mmWave bands, such as 120 kHz, 240 kHz, 480 kHz, and/or 960 kHz. In certain cases, the UE may perform the alignment at block 602 for one or more SCSs used in frequency bands in 52.6 GHz to 71 GHz, such as 480 kHz and/or 960 kHz (or other higher SCSs).

In certain cases, the UE may perform the alignment at block 602 in response to the USS being configured. That is, the USS configuration may be an implicit trigger to perform the alignment between the USS and CSS at block 602. For example, if the UE is configured with a multi-slot USS monitoring, and the UE will be using the CSS for PDCCH monitoring, the UE may monitor the CSS at the monitoring occasions associated with the USS or within the same slot as the USS. The UE may ignore the monitoring occasions mapped to the SSB(s), for example, the monitoring occasions 502 depicted in FIG. 5. With respect to the operations 600, the UE may receive an indication of the second set of monitoring occasions associated with the USS. For example, the UE may receive radio resource control (RRC) signaling providing a search space configuration for the USS. At block 604, the UE may align the first set of monitoring occasions in response to receiving the indication of the second set of monitoring occasions associated with the USS.

In certain cases, the UE may align the CSS monitoring occasions with the USS monitoring occasions under the condition that the same CORESET is configured for CSS and USS. The UE may align the first set of monitoring occasions with the second set of monitoring occasions, if the USS and the CSS are in the same CORESET. If there are multiple USSs configured with different CORESETs, the CSS may be aligned with the USS within the same CORESET. For example, the UE may identify that the USS among a plurality of USSs in a plurality of CORESETs is in the same CORESET as the CSS, and the UE The UE may align the first set of monitoring occasions with the second set of monitoring occasions based on the identification. That is, the UE may select the USS having the same CORESET as the CSS to perform the alignment between the USS and the CSS.

In certain cases, the UE may be configured to skip certain monitoring occasions in the USS, for example, in a power saving mode. That is, the UE may refrain from monitoring the PDCCH at certain monitoring occasions flagged as being disabled for that USS. In certain aspects, the UE may assume the disabled or skipped USS monitoring occasions are available for determining the alignment between the USS and CSS. In such a case, the PDCCH skipping may only be applied to the USS and not to the CSS. For certain aspects, the UE may assume the disabled or skipped USS monitoring occasions are not available for determining the alignment between the USS and CSS. That is, the PDCCH skipping for the USS may also apply to the CSS. With respect to the operations 600, the UE may align the first set of monitoring occasions with the second set of monitoring occasions that includes one or more monitoring occasions to skip. For example, the UE may align at least one monitoring occasion from the first set of monitoring occasions with a monitoring occasion that will be skipped in the second set of monitoring occasions.

If a USS is not configured, the UE may monitor the PDCCH for the CSS according to the SSB mapping described herein with respect to FIG. 5. That is, if the USS is not configured at the UE, the UE may not perform the alignment between the CSS and USS described herein.

In certain aspects, the UE may receive a configuration for the arrangement of the CSS monitoring occasions that is separate from the arrangement derived from the SSB mapping described herein with respect to FIG. 5. For example, the UE may receive the configuration for the CSS monitoring occasions based on the locations of the SSBs in time as illustrated in FIG. 5, and the UE may receive an additional configuration that overrides the previous configuration based on SSB mapping. This additional configuration (which may be referred to as the CSS pattern) may provide the time domain locations for the monitoring occasions in terms of symbol offsets and durations within one or more slots. In certain cases, the CSS pattern may be configured with a periodicity associated with the sequence of monitoring occasions. The CSS pattern may be associated with one or more subcarrier spacings and/or SSBs. The network may configure the CSS pattern to be in alignment (or in partial alignment) with the USS monitoring occasions assigned to the UE. The CSS pattern may be determined by the network, preconfigured, or derived from a preconfigured pattern. For example, the network and UE may be preconfigured with a sequence monitoring occasions across one or more slots, and specific monitoring occasions may be enabled or disabled within that sequence similar to the techniques for configuring the SSB locations based on the bitmap ssb-PositionsInBurst.

With respect to the operations 600, the UE may receive a configuration indicating monitoring occasions for the CSS, where the configuration may be separate from another configuration providing the CSS monitoring occasions mapped to the SSB positions in a burst of SSBs. Assuming that the indicated monitoring occasions are aligned with the USS, the UE may apply the indicated monitoring occasions as the first set of monitoring occasions that are aligned with the second set of monitoring occasions. In other words, at block 602, the UE may consider the indicated monitoring occasions for the CSS as being aligned with the USS.

In certain cases, the CSS pattern may not be aligned with the USS, or the CSS pattern may be partially aligned with the USS. If the monitoring occasions for the CSS and the USS do not comply with the monitoring capabilities of the UE, for example, the UE may determine which monitoring occasions to use from the CSS and USS monitoring occasions at block 602. For example, the UE may drop monitoring occasions for the USS to follow the CSS. In certain cases, the UE may drop monitoring occasions for the CSS to follow the USS.

With respect to the operations 600, the UE may receive a configuration indicating monitoring occasions for the CSS, and the UE may identify that at least one of the indicated monitoring occasions is misaligned with the second set of monitoring occasions. At block 602, the UE may drop the misaligned monitoring occasion(s) from the indicated monitoring occasions and apply the remaining indicated monitoring occasions as the first set of monitoring occasions that are aligned with the first set of monitoring occasions. In certain cases, the UE may identify that at least one of monitoring occasions from the second set of monitoring occasions is misaligned with the indicated monitoring occasions, and the UE may drop the misaligned monitoring occasion(s) from the second set of monitoring occasions.

Figure 7:
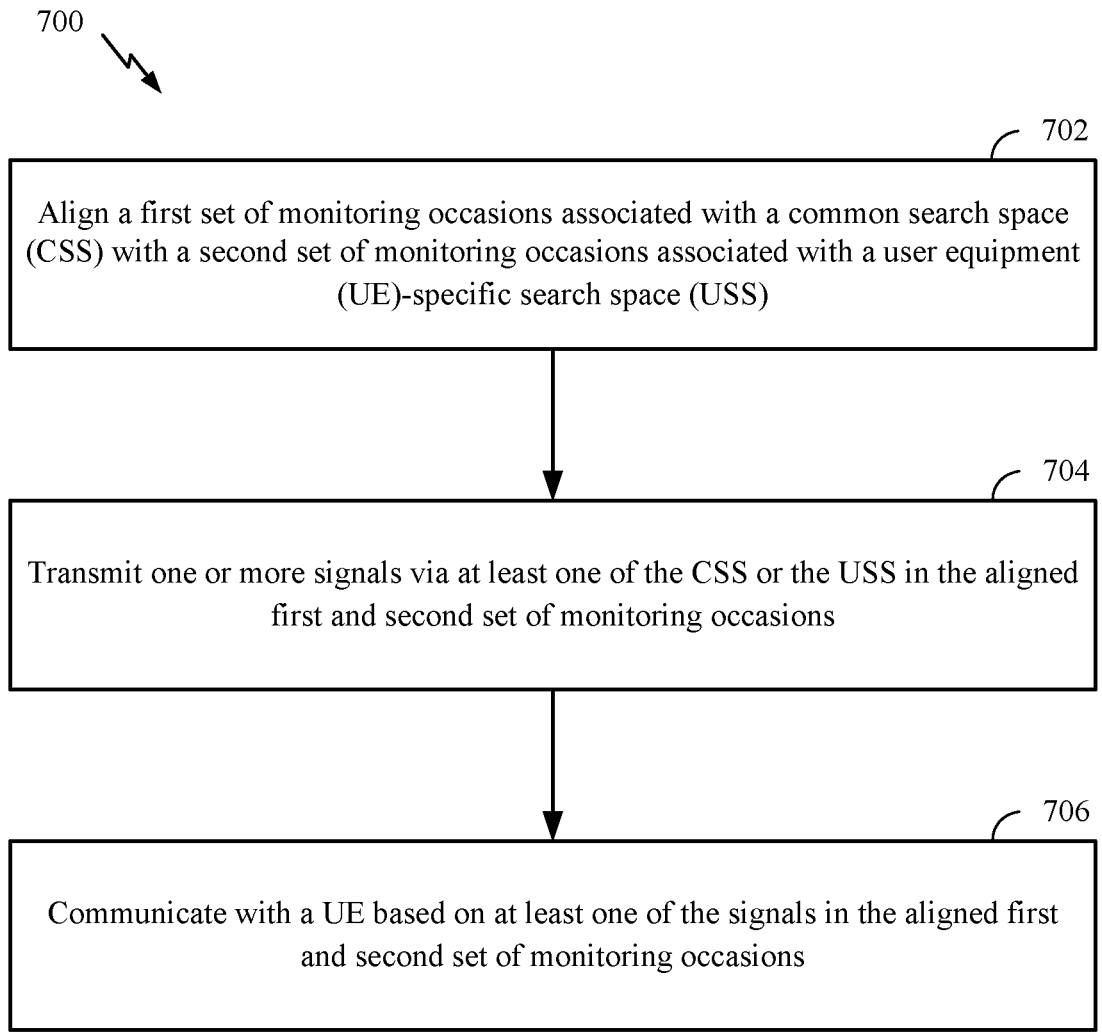
FIG. 7 is a flow diagram illustrating example operations for wireless communication by a network entity, in accordance with certain aspects of the present disclosure.

FIG. 7 is a flow diagram illustrating example operations 700 for wireless communication, in accordance with certain aspects of the present disclosure. The operations 700 may be performed, for example, by a network entity (such as the BS 110a in the wireless communication network 100). The operations 700 may be complementary to the operations 600 performed by the UE. The operations 700 may be implemented as software components that are executed and run on one or more processors (e.g., controller/processor 240 of FIG. 2). Further, the transmission and reception of signals by the network entity in operations 700 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals. As used herein, the network entity may refer to a wireless communication device in a radio access network, such as a base station, a remote radio head or antenna panel in communication with a base station, and/or network controller.

The operations 700 may begin, at block 702, where the network entity may align a first set of monitoring occasions associated with a CSS with a second set of monitoring occasions associated with USS. The network entity may select one or more monitoring occasions from the first set of monitoring occasions that are aligned with the second set of monitoring occasions, and the network may use the selected monitoring occasions for monitoring the PDCCH in the CSS. In aspects, aligning the CSS and USS monitoring occasions may involve adjusting or adding one or more monitoring occasions associated with the CSS and/or USS to be in alignment with monitoring occasion(s) for the counterpart search space. In aspects, the network entity may send two sets of common control signals for UEs with a CSS aligned with a USS and for UEs without a USS.

At block 704, the network entity may transmit one or more signals via at least one of the CSS or the USS in the aligned first and second set of monitoring occasions. For example, the network entity may transmit signaling that provides updated system information or a random access response in the CSS monitoring occasions, and the network entity may transmit UE-specific DCI (e.g., user specific scheduling for downlink and/or uplink traffic) in the USS monitoring occasions.

At block 706, the network entity may communicate with a UE based on at least one of the signals in the aligned first and second set of monitoring occasions. For example, the network entity may send updated system information parameters (such as updated RACH parameters) in the CSS, and the network entity may perform a RACH procedure using the updated parameters. The network entity may transmit scheduling for downlink or uplink data transmissions in the USS, and at block 706, the network entity may transmit the uplink data or receive the downlink data according to the scheduling received.

In certain cases, the network entity may perform the alignment at block 702 in response to the USS being configured at a UE, for example, as described herein with respect to the operations 600. That is, the alignment at block 702 may be performed on a case-by-case basis for the USS assigned to one of the UEs. The network entity may transmit an indication of the second set of monitoring occasions associated with the USS, and the network entity may align the first set of monitoring occasions in response to the transmission of the indication of the second set of monitoring occasions associated with the USS.

In certain cases, the network entity may align the CSS monitoring occasions with the USS monitoring occasions under the condition that the same CORESET is configured for CSS and USS, for example, as described herein with respect to the operations 600. At block 702, the network entity may align the first set of monitoring occasions with the second set of monitoring occasions, if the USS and the CSS are in a same control resource set. If there are multiple USSs assigned to a UE, the network entity may select the USS configured in the same CORESET as the CSS to perform the alignment at block 702. For example, the network entity may identify that the USS among a plurality of USSs in a plurality of CORESETs is in the same CORESET as the CSS, and the network entity may align the first set of monitoring occasions with the second set of monitoring occasions based on the identification. The network entity may handle skipped monitoring occasions in the USS as described herein with respect to the operations 600.

In certain aspects, the network entity may send, to the UE, a configuration for the arrangement of the CSS monitoring occasions that is separate from the arrangement derived from the SSB mapping described herein with respect to FIG. 5. The network entity may transmit a configuration indicating monitoring occasions for the CSS, and the network entity may apply the indicated monitoring occasions as the first set of monitoring occasions that are aligned with the first set of monitoring occasions, at block 702. If the monitoring occasions for the CSS and the USS do not comply with the monitoring capabilities of the UE, for example, the network entity may determine which monitoring occasions to use from the CSS and USS monitoring occasions at block 702. For example, the network entity may drop monitoring occasions for the USS to follow the CSS. In certain cases, the network entity may drop monitoring occasions for the CSS to follow the USS.

With respect to the operations 700, the network entity identify that at least one of the indicated monitoring occasions is misaligned with the second set of monitoring occasions. The network entity may drop the misaligned monitoring occasions from the indicated monitoring occasions, and the network entity may apply the remaining indicated monitoring occasions as the first set of monitoring occasions that are aligned with the first set of monitoring occasions. In certain cases, the network entity may identify that at least one of monitoring occasions from the second set of monitoring occasions is misaligned with the indicated monitoring occasions, and the network entity may drop the misaligned monitoring occasion(s) from the second set of monitoring occasions.

Figure 8:
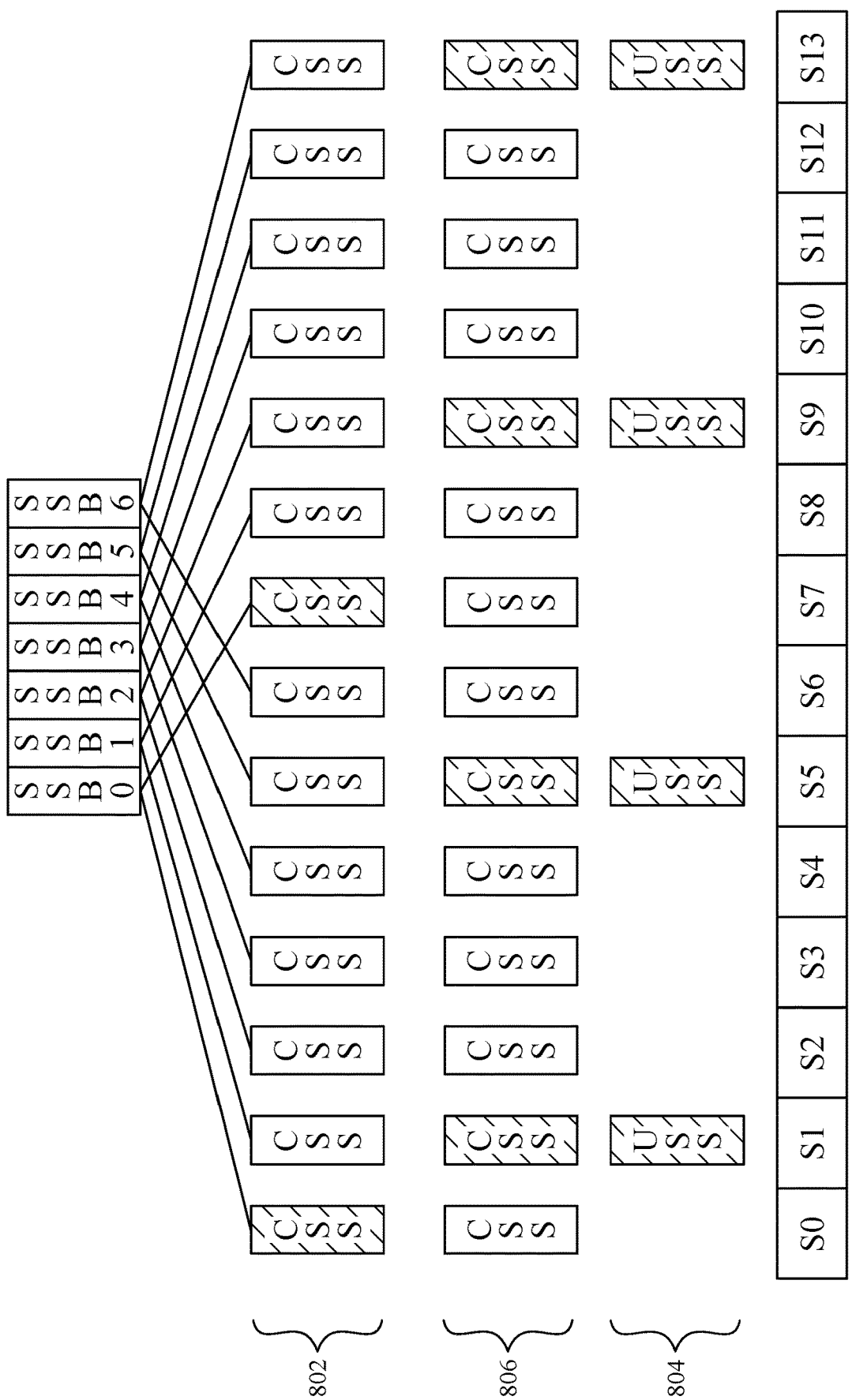
FIG. 8 is a diagram illustrating monitoring occasions for a CSS and USS that are aligned across a sequence of slots, in accordance with certain aspects of the present disclosure.

FIG. 8 is a diagram illustrating monitoring occasions for a CSS and USS that are aligned across a sequence of slots (S0 through S13), in accordance with certain aspects of the present disclosure. In this example, the UE may be configured with SSB-derived monitoring occasions 802 for a CSS and monitoring occasions 804 for a USS, where the USS monitoring occasions 804 are arranged in slots S1, S5, S9, and S13. In response to the misalignment or being configured with the USS, the UE may select monitoring occasions for the CSS that are compatible with the monitoring capabilities of the UE. For example, the UE may align the CSS monitoring occasions 802 with the USS monitoring occasions 804 to provide a new set of CSS monitoring occasions 806, where the CSS monitoring occasions 806 are arranged in S1, S5, S9, and S13 with the USS monitoring occasions. In certain cases, the UE may receive a configuration from the network providing the CSS monitoring occasions 806. In other cases, the UE may select the monitoring occasions 806 based on the locations of the USS monitoring occasions 804. In this example, the CSS monitoring occasions 802 and USS monitoring occasions 804 are fully misaligned. In certain cases, the SSB-derived monitoring occasions 802 may be partially aligned with the USS monitoring occasions 804, and in such cases, the UE may use the monitoring occasions for the CSS that are already in alignment with the USS.

Figure 9:
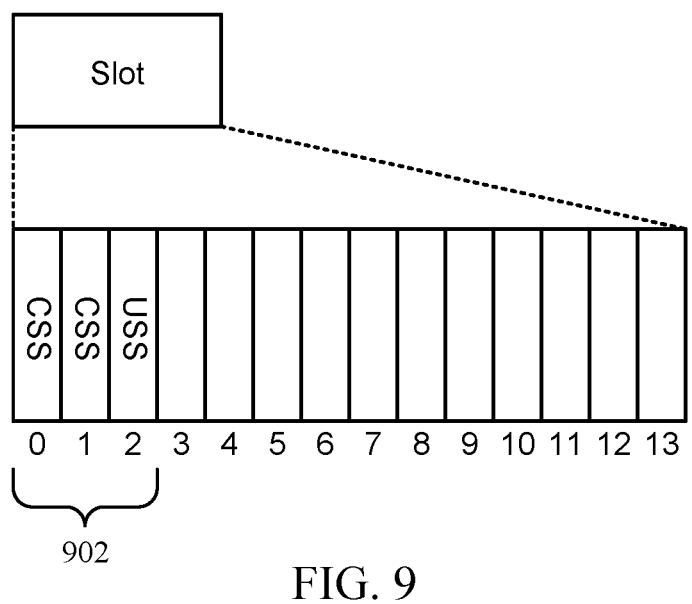
FIG. 9 is a diagram illustrating example monitoring occasions for CSS and USS that may be considered to be aligned within a slot, in accordance with certain aspects of the present disclosure.

FIG. 9 is a diagram illustrating example monitoring occasions for CSS and USS that may be considered to be aligned within a slot, in accordance with certain aspects of the present disclosure. In this example, a USS may be arranged in the third symbol of a slot, while the CSS may be arranged in the first and second symbols in the same slot. A moving time window 902 may be used to ascertain if the monitoring occasions for the USS and CSS are aligned with each other. Because the monitoring occasions for the USS and CSS are within the time window 902 (e.g., three consecutive symbols) in the same slot, these monitoring occasions may be considered aligned with each other. The monitoring occasions for the USS and CSS may not fully overlap with each other, but they may be in the same slot or span of symbols and can be handled by the UE capability. The UE and/or network entity may adjust or add monitoring occasions for the CSS to be in alignment with the monitoring occasions for the USS, for example, as depicted in FIG. 9. In certain cases, the UE and/or network may identify if monitoring occasions for the CSS and USS are aligned with each other using a time window, such as the time window 902.

Those of skill in the art will understand that the symbol arrangement for the CSS and USS illustrated in FIG. 9 is exemplary only. Other arrangements may be used for aligning the CSS with the USS, such as the USS being in the first symbol and the CSS being in the second symbol, or the USS being in the second symbol and the CSS being in the first and third symbols. In certain aspects, other time windows may be used for identifying whether the CSS is aligned with the USS in addition to or instead of the 3-symbol time window 902, such as a sequence of one or more symbols and/or one or more slots.

Figure 10:
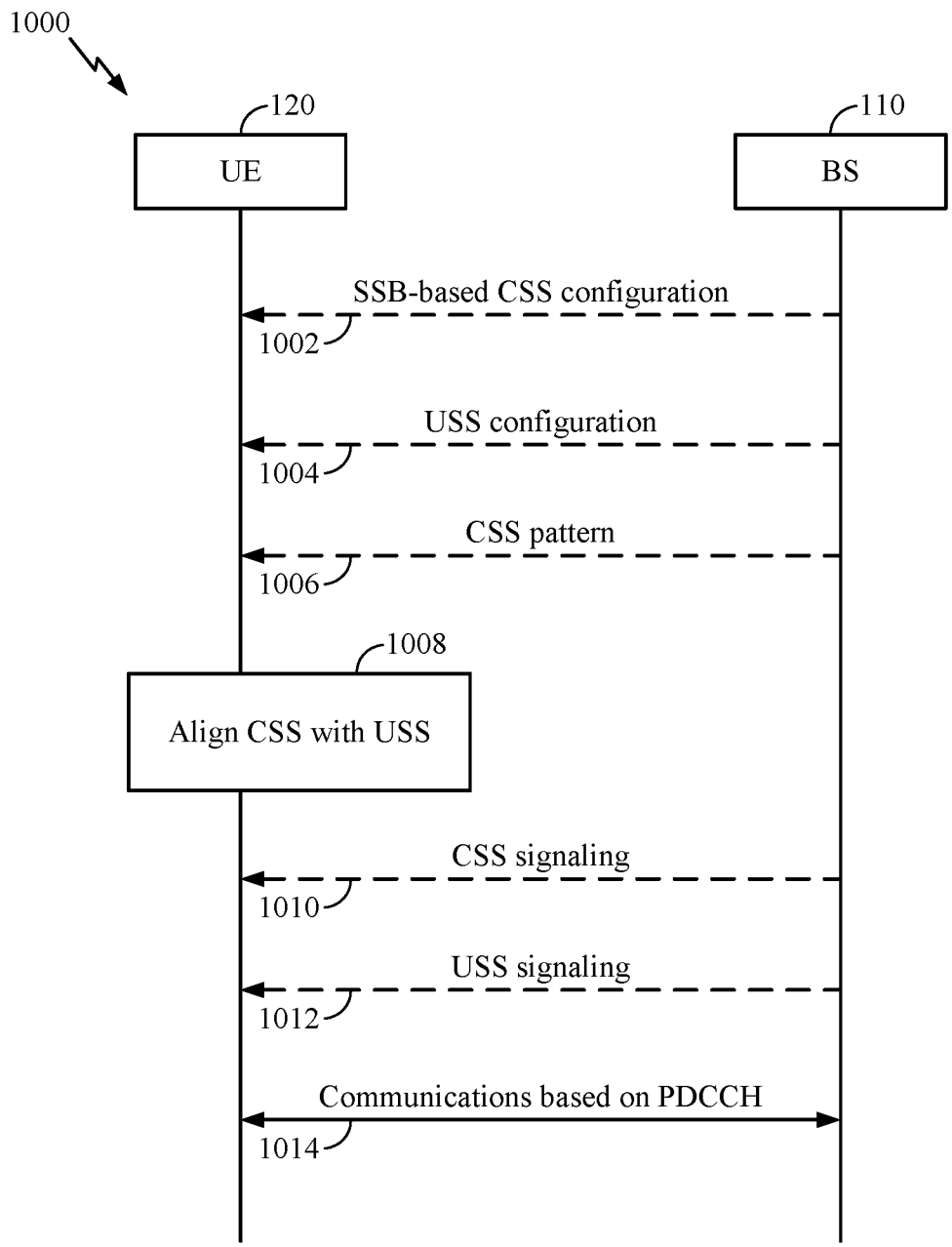
FIG. 10 is a signaling flow diagram illustrating example signaling for search space alignment, in accordance with aspects of the present disclosure.

FIG. 10 is a signaling flow diagram illustrating example signaling 1000 for aligning search spaces, in accordance with aspects of the present disclosure. At 1002, the UE 120 may receive a configuration for the CSS monitoring occasions as derived from the SSB locations, for example, as described herein with respect to FIGS. 5 and 9. At 1004, the UE 120 may receive a configuration for the USS monitoring occasions, for example, as described herein with respect to FIG. 9. Optionally, at 1006, the UE 120 may receive another configuration for the CSS monitoring occasions (e.g., the CSS pattern described herein with respect to the operations 600) that may be aligned with the USS.

At 1008, the UE 120 may align the CSS monitoring occasions with the USS monitoring occasions. For example, the UE 120 may align the CSS and USS in response to receiving the USS configuration at 1004. The alignment at 1008 may involve the UE 120 selecting, adding, dropping, or adjusting monitoring occasions for the CSS to be in alignment with the USS. In certain cases, the UE 120 may apply the configuration received at 1006 as the CSS monitoring occasions that are aligned with the USS monitoring occasions. In certain cases, the UE 120 may adjust the monitoring occasions received at 1006 due to some misalignments between the CSS and USS monitoring occasions.

At 1010, the UE 120 may receive CSS signaling from the BS 110 via at least one of the CSS monitoring occasions. For example, the UE 120 may receive a random access response from the BS 110 in the CSS. At 1012, the UE 120 may receive signaling from the BS 110 via at least one of the USS monitoring occasions. For example, the UE 120 may receive DCI that schedules a downlink transmission to the UE.

At 1014, the UE 120 may communicate with the BS 110 based on the received at 1010 and/or 1012. For example, the random access response at 1010 may provide an uplink grant to the UE 120, and the UE 120 may transmit data to the BS 110 via the resources scheduled in the random access response at 1014. As another example, the UE 120 may receive downlink data from the BS 110 via the resources scheduled in the DCI at 1012.

It will be appreciated that the apparatus and techniques for search space alignment may provide various advantages. For example, the search space alignment described herein may facilitate the UE to monitor for signaling from the network within the monitoring capabilities of the UE, such as multi-slot monitoring at certain mmWave bands. The search space alignment described herein may also enable the use of high frequency subcarrier spacings (such as 480 kHz and/or 960 kHz) for downlink signaling. The search space alignment described herein may also enable a desirable level of power consumption used by the UE to monitor for signaling across separate search spaces for common and UE-specific signaling.

Figure 11:
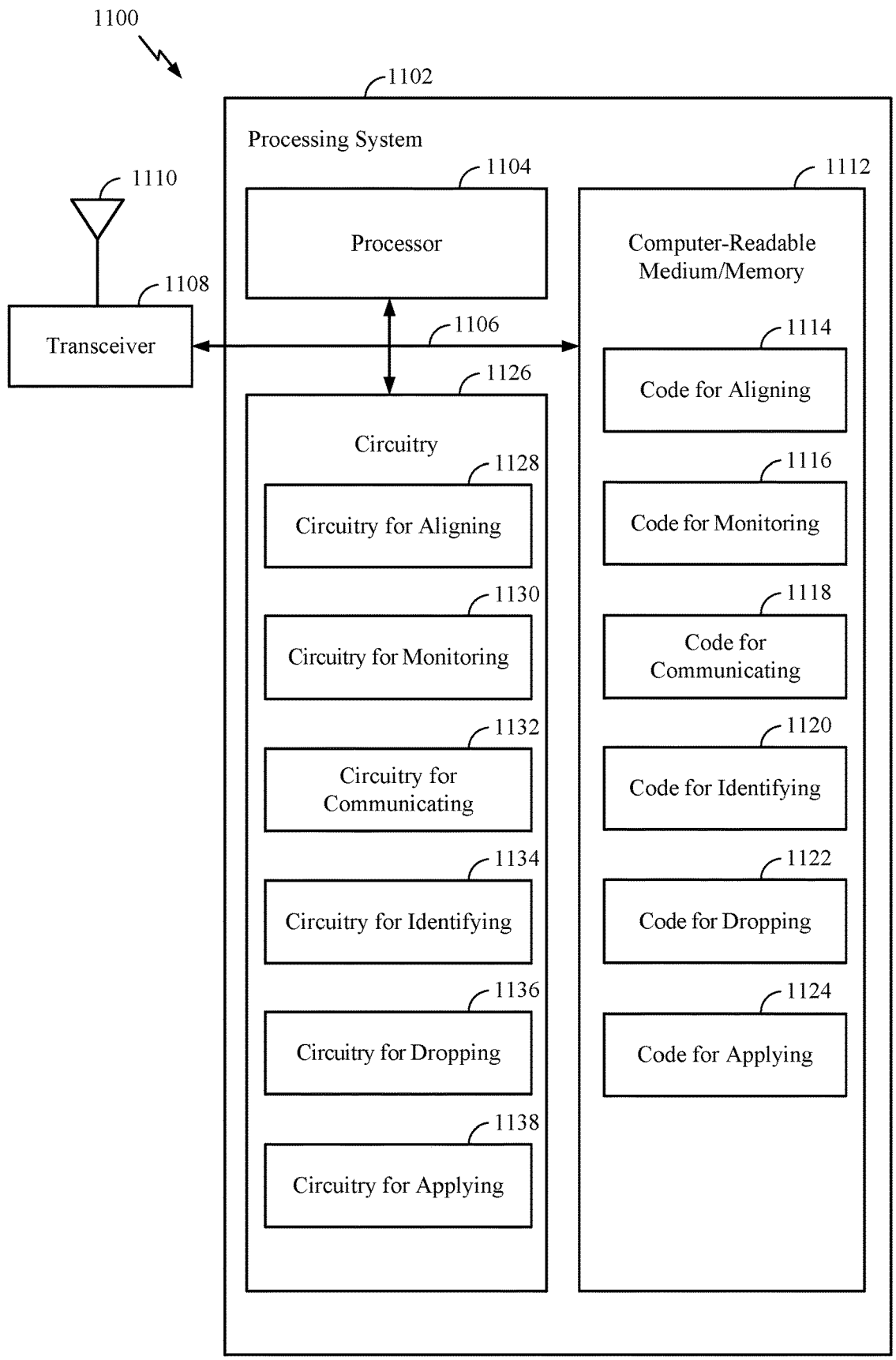
FIG. 11 illustrates a communications device (e.g., a UE) that may include various components configured to perform operations for the techniques disclosed herein in accordance with aspects of the present disclosure.

FIG. 11 illustrates a communications device 1100 (e.g., a UE) that may include various components (e.g., corresponding to means-plus-function components) configured to perform operations for the techniques disclosed herein, such as the operations illustrated in FIG. 6. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code or executable instructions) that when executed by the processor 1104, cause the processor 1104 or the communications device 1100 to perform the operations illustrated in FIG. 6, or other operations for performing the various techniques discussed herein for search space alignment. In certain aspects, computer-readable medium/memory 1112 stores code for aligning 1114, code for monitoring 1116, code for communicating (e.g., transmitting and/or receiving) 1118, code for identifying (and/or selecting) 1118, code for dropping 1122, and/or code for applying 1124. In certain aspects, the processing system 1102 has circuitry 1126 configured to implement the code stored in the computer-readable medium/memory 1112. In certain aspects, the circuitry 1126 is coupled to the processor 1104 and/or the computer-readable medium/memory 1112 via the bus 1106. For example, the circuitry 1126 includes circuitry for aligning 1128, circuitry for monitoring 1130, circuitry for communicating (e.g., transmitting and/or receiving) 1132, circuitry for identifying (and/or selecting) 1134, circuitry for dropping 1136, and/or circuitry for applying 1138.

Various components of the communications device 1100 may provide means for performing the methods described herein, including with respect to FIGS. 6 and 8-10.

In some examples, means for transmitting or sending (or means for outputting for transmission or means for communicating) may include the transceivers 254 and/or antenna(s) 252 of the user equipment 120 illustrated in FIG. 2 and/or transceiver 1108 and antenna 1110 of the communication device 1100 in FIG. 11.

In some examples, means for receiving (or means for obtaining, means for monitoring, or means for communicating) may include the transceivers 254 and/or antenna(s) 252 of the user equipment 120 illustrated in FIG. 2 and/or transceiver 1108 and antenna 1110 of the communication device 1100 in FIG. 11.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for identifying, means for selecting, means for dropping, and/or means for applying may include various processing system components, such as: the processor 1104 in FIG. 11, or aspects of the user equipment 120 depicted in FIG. 2, including receive processor 258, transmit processor 264, TX MIMO processor 266, and/or controller/processor 280 (including the search space manage 281).

Notably, FIG. 11 is an example, and many other examples and configurations of communication device are possible.

Figure 12:
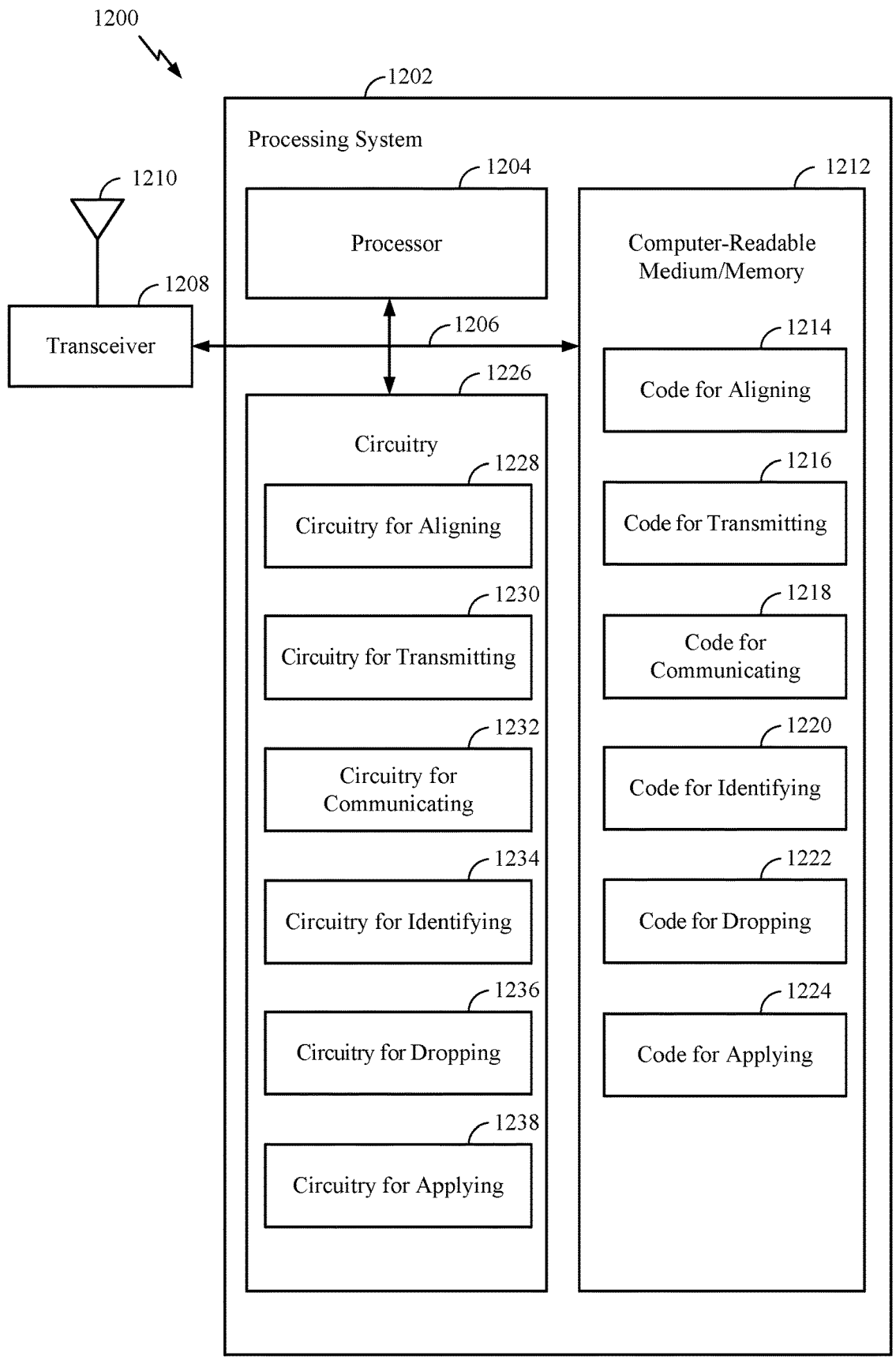
FIG. 12 illustrates a communications device (e.g., a BS) that may include various components configured to perform operations for the techniques disclosed herein in accordance with aspects of the present disclosure.

FIG. 12 illustrates a communications device 1200 (e.g., a BS and/or network controller) that may include various components (e.g., corresponding to means-plus-function components) configured to perform operations for the techniques disclosed herein, such as the operations illustrated in FIG. 7. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code or executable instructions) that when executed by the processor 1204, cause the processor 1204 or the communications device 1200 to perform the operations illustrated in FIG. 7, or other operations for performing the various techniques discussed herein for search space alignment. In certain aspects, computer-readable medium/memory 1212 stores code for aligning 1214, code for transmitting 1216, code for communicating (e.g., transmitting and/or receiving) 1218, code for identifying (and/or selecting) 1220, code for dropping 1222, and/or code for applying 1224. In certain aspects, the processing system 1202 has circuitry 1226 configured to implement the code stored in the computer-readable medium/memory 1212. In certain aspects, the circuitry 1226 is coupled to the processor 1204 and/or the computer-readable medium/memory 1212 via the bus 1206. For example, the circuitry 1226 includes circuitry for aligning 1228, circuitry for transmitting 1230, and/or circuitry for communicating (e.g., transmitting and/or receiving) 1232, circuitry for identifying (and/or selecting) 1234, circuitry for dropping 1236, and/or circuitry for applying 1238.

Various components of the communications device 1200 may provide means for performing the methods described herein, including with respect to FIGS. 7-10.

In some examples, means for transmitting or sending (or means for outputting for transmission or means for communicating) may include the transceivers 232 and/or antenna(s) 234 of the base station 110 illustrated in FIG. 2 and/or transceiver 1208 and antenna 1210 of the communication device 1200 in FIG. 12.

In some examples, means for receiving (or means for obtaining or means for communicating) may include the transceivers 232 and/or antenna(s) 234 of the base station illustrated in FIG. 2 and/or transceiver 1208 and antenna 1210 of the communication device 1200 in FIG. 12.

In some examples, means for selecting, means for identifying, means for applying, and/or means for dropping may include various processing system components, such as: the processor 1204 in FIG. 12, or aspects of the base station 110 depicted in FIG. 2, including receive processor 238, transmit processor 220, TX MIMO processor 230, and/or controller/processor 240 (including the search space manager 241).

Notably, FIG. 12 is an example, and many other examples and configurations of communication device 1200 are possible.

Example Aspects

In addition to the various aspects described above, specific combinations of aspects are within the scope of the disclosure, some of which are detailed below:

Aspect 1: A method of wireless communication by a user equipment (UE), comprising: aligning a first set of monitoring occasions associated with a common search space (CSS) with a second set of monitoring occasions associated with a UE-specific search space (USS); monitoring for signals from a network entity via at least one of the CSS or the USS in the aligned first and second set of monitoring occasions; and communicating with a network entity based on reception of at least one of the signals in the aligned first and second set of monitoring occasions.

Aspect 2: The method of Aspect 1, wherein aligning the first set of monitoring occasions comprises selecting one or more monitoring occasions from the first set of monitoring occasions that are aligned with the second set of monitoring occasions.

Aspect 3: The method of Aspect 1 or 2, further comprising: receiving an indication of the second set of monitoring occasions associated with the USS; and wherein aligning the first set of monitoring occasions comprises aligning the first set of monitoring occasions in response to receiving the indication of the second set of monitoring occasions associated with the USS.

Aspect 4: The method according to any of Aspects 1-3, wherein aligning the first set of monitoring occasions comprises aligning the first set of monitoring occasions with the second set of monitoring occasions, if the USS and the CSS are in a same control resource set.

Aspect 5: The method according to any of Aspects 1-4, further comprising: identifying that the USS among a plurality of USSs in a plurality of control resource sets is in a same control resource set as the CSS; and wherein aligning the first set of monitoring occasions comprises aligning the first set of monitoring occasions with the second set of monitoring occasions based on the identification.

Aspect 6: The method according to any of Aspects 1-5, wherein aligning the first set of monitoring occasions comprises aligning the first set of monitoring occasions with the second set of monitoring occasions that includes one or more monitoring occasions to skip.

Aspect 7: The method according to any of Aspects 1-6, wherein aligning the first set of monitoring occasions comprises aligning at least one monitoring occasion from the first set of monitoring occasions with a monitoring occasion that will be skipped in the second set of monitoring occasions.

Aspect 8: The method according to any of Aspects 1-7, further comprising: receiving a configuration indicating monitoring occasions for the CSS; and wherein aligning the first set of monitoring occasions comprises applying the indicated monitoring occasions as the first set of monitoring occasions that are aligned with the second set of monitoring occasions.

Aspect 9: The method according to any of Aspects 1-7, further comprising: receiving a configuration indicating monitoring occasions for the CSS; identifying that at least one of the indicated monitoring occasions is misaligned with the second set of monitoring occasions; and wherein aligning the first set of monitoring occasions comprises: dropping the at least one of the indicated monitoring occasions from the indicated monitoring occasions; and applying the remaining indicated monitoring occasions as the first set of monitoring occasions that are aligned with the first set of monitoring occasions.

Aspect 10: The method according to any of Aspects 1-7, further comprising: receiving a configuration indicating monitoring occasions for the CSS; identifying that at least one of monitoring occasions from the second set of monitoring occasions is misaligned with the indicated monitoring occasions; and wherein aligning the first set of monitoring occasions comprises dropping the at least one monitoring occasion from the second set of monitoring occasions.

Aspect 11: The method according to any of Aspects 1-10, wherein aligning the first set of monitoring occasions comprises selecting one or more monitoring occasions from the first set of monitoring occasions that are aligned with the second set of monitoring occasions at a slot level.

Aspect 12: The method according to any of Aspects 1-11, wherein: aligning the first set of monitoring occasions comprises selecting one or more monitoring occasions from the first set of monitoring occasions that are aligned with the second set of monitoring occasions; and adjacent monitoring occasions in the selected one or more monitoring occasions are in non-consecutive slots.

Aspect 13: The method according to any of Aspects 1-12, wherein adjacent monitoring occasions in the first or second set of monitoring occasions are in non-consecutive slots.

Aspect 14: The method according to any of Aspects 1-14, wherein monitoring for signals comprises monitoring for the signals at a subcarrier spacing of 480 kHz or 960 kHz.

Aspect 15: A method of wireless communication by a network entity, comprising: aligning a first set of monitoring occasions associated with a common search space (CSS) with a second set of monitoring occasions associated with a user equipment (UE)-specific search space (USS); transmitting one or more signals via at least one of the CSS or the USS in the aligned first and second set of monitoring occasions; and communicating with a UE based on at least one of the signals in the aligned first and second set of monitoring occasions.

Aspect 16: The method of Aspect 15, wherein aligning the first set of monitoring occasions comprises selecting one or more monitoring occasions from the first set of monitoring occasions that are aligned with the second set of monitoring occasions.

Aspect 17: The method of Aspect 15 or 16, further comprising: transmitting an indication of the second set of monitoring occasions associated with the USS; and wherein aligning the first set of monitoring occasions comprises aligning the first set of monitoring occasions in response to transmitting the indication of the second set of monitoring occasions associated with the USS.

Aspect 18: The method according to any of Aspects 15-17, wherein aligning the first set of monitoring occasions comprises aligning the first set of monitoring occasions with the second set of monitoring occasions, if the USS and the CSS are in a same control resource set.

Aspect 19: The method according to any of Aspects 15-18, further comprising: identifying that the USS among a plurality of USSs in a plurality of control resource sets is in a same control resource set as the CSS; and wherein aligning the first set of monitoring occasions comprises aligning the first set of monitoring occasions with the second set of monitoring occasions based on the identification.

Aspect 20: The method according to any of Aspects 15-19, wherein aligning the first set of monitoring occasions comprises aligning the first set of monitoring occasions with the second set of monitoring occasions that includes one or more monitoring occasions to skip.

Aspect 21: The method according to any of Aspects 15-20, wherein aligning the first set of monitoring occasions comprises aligning at least one monitoring occasion from the first set of monitoring occasions with a monitoring occasion that will be skipped in the second set of monitoring occasions.

Aspect 22: The method according to any of Aspects 15-21, further comprising: transmitting a configuration indicating monitoring occasions for the CSS; and wherein aligning the first set of monitoring occasions comprises applying the indicated monitoring occasions as the first set of monitoring occasions that are aligned with the first set of monitoring occasions.

Aspect 23: The method according to any of Aspects 15-21, further comprising: transmitting a configuration indicating monitoring occasions for the CSS; identifying that at least one of the indicated monitoring occasions is misaligned with the second set of monitoring occasions; and wherein aligning the first set of monitoring occasions comprises: dropping the at least one of the indicated monitoring occasions from the indicated monitoring occasions; and applying the remaining indicated monitoring occasions as the first set of monitoring occasions that are aligned with the first set of monitoring occasions.

Aspect 24: The method according to any of Aspects 15-21, further comprising: transmitting a configuration indicating monitoring occasions for the CSS; identifying that at least one of monitoring occasions from the second set of monitoring occasions is misaligned with the indicated monitoring occasions; and wherein aligning the first set of monitoring occasions comprises dropping the at least one monitoring occasion from the second set of monitoring occasions.

Aspect 25: The method according to any of Aspects 15-24, wherein aligning the first set of monitoring occasions comprises selecting one or more monitoring occasions from the first set of monitoring occasions that are aligned with the second set of monitoring occasions at a slot level.

Aspect 26: The method according to any of Aspects 15-25, wherein: aligning the first set of monitoring occasions comprises selecting one or more monitoring occasions from the first set of monitoring occasions that are aligned with the second set of monitoring occasions; and adjacent monitoring occasions in the selected one or more monitoring occasions are in non-consecutive slots.

Aspect 27: The method according to any of Aspects 15-26, wherein adjacent monitoring occasions in the first or second set of monitoring occasions are in non-consecutive slots.

Aspect 28: The method according to any of Aspects 15-27, wherein transmitting the one or more signals comprises transmitting the one or more signals at a subcarrier spacing of 480 kHz or 960 kHz.

Aspect 29: An apparatus for wireless communication, comprising: a memory comprising executable instructions; and a processor coupled to the memory, the processor being configured to execute the executable instructions and cause the apparatus to: align a first set of monitoring occasions associated with a common search space (CSS) with a second set of monitoring occasions associated with a UE-specific search space (USS), monitor for signals from a network entity via at least one of the CSS or the USS in the aligned first and second set of monitoring occasions, and communicate with a network entity based on reception of at least one of the signals in the aligned first and second set of monitoring occasions.

Aspect 30: The apparatus of Aspect 29, wherein to align the first set of monitoring occasions, the processor is further configured to execute the executable instructions and cause the apparatus to select one or more monitoring occasions from the first set of monitoring occasions that are aligned with the second set of monitoring occasions.

Aspect 31: The apparatus of Aspect 29 or 30, wherein: the processor is further configured to execute the executable instructions and cause the apparatus to receive an indication of the second set of monitoring occasions associated with the USS; and to align the first set of monitoring occasions, the processor is further configured to execute the executable instructions and cause the apparatus to align the first set of monitoring occasions in response to receiving the indication of the second set of monitoring occasions associated with the USS.

Aspect 32: The apparatus according to any of Aspects 29-31, wherein to align the first set of monitoring occasions, the processor is further configured to execute the executable instructions and cause the apparatus to align the first set of monitoring occasions with the second set of monitoring occasions, if the USS and the CSS are in a same control resource set.

Aspect 33: The apparatus according to any of Aspects 29-32, wherein: the processor is further configured to execute the executable instructions and cause the apparatus to identify that the USS among a plurality of USSs in a plurality of control resource sets is in a same control resource set as the CSS; and to align the first set of monitoring occasions, the processor is further configured to execute the executable instructions and cause the apparatus to align the first set of monitoring occasions with the second set of monitoring occasions based on the identification.

Aspect 34: The apparatus according to any of Aspects 29-33, wherein to align the first set of monitoring occasions, the processor is further configured to execute the executable instructions and cause the apparatus to align the first set of monitoring occasions with the second set of monitoring occasions that includes one or more monitoring occasions to skip.

Aspect 35: The apparatus according to any of Aspects 29-34, wherein to aligning the first set of monitoring occasions, the processor is further configured to execute the executable instructions and cause the apparatus to align at least one monitoring occasion from the first set of monitoring occasions with a monitoring occasion that will be skipped in the second set of monitoring occasions.

Aspect 36: The apparatus according to any of Aspects 29-35, wherein: the processor is further configured to execute the executable instructions and cause the apparatus to receive a configuration indicating monitoring occasions for the CSS; and to align the first set of monitoring occasions, the processor is further configured to execute the executable instructions and cause the apparatus to apply the indicated monitoring occasions as the first set of monitoring occasions that are aligned with the second set of monitoring occasions.

Aspect 37: The apparatus according to any of Aspects 29-36, wherein: the processor is further configured to execute the executable instructions and cause the apparatus to: receive a configuration indicating monitoring occasions for the CSS, and identify that at least one of the indicated monitoring occasions is misaligned with the second set of monitoring occasions; and wherein to align the first set of monitoring occasions, the processor is further configured to execute the executable instructions and cause the apparatus to: drop the at least one of the indicated monitoring occasions from the indicated monitoring occasions, and apply the remaining indicated monitoring occasions as the first set of monitoring occasions that are aligned with the second set of monitoring occasions.

Aspect 38: The apparatus according to any of Aspects 29-37, wherein: the processor is further configured to execute the executable instructions and cause the apparatus to: receive a configuration indicating monitoring occasions for the CSS, and identify that at least one of monitoring occasions from the second set of monitoring occasions is misaligned with the indicated monitoring occasions; and wherein to align the first set of monitoring occasions, the processor is further configured to execute the executable instructions and cause the apparatus to drop the at least one monitoring occasion from the second set of monitoring occasions.

Aspect 39: The apparatus according to any of Aspects 29-38, wherein to align the first set of monitoring occasions, the processor is further configured to execute the executable instructions and cause the apparatus to select one or more monitoring occasions from the first set of monitoring occasions that are aligned with the second set of monitoring occasions at a slot level.

Aspect 40: The apparatus according to any of Aspects 29-39, wherein to monitor for signals, the processor is further configured to execute the executable instructions and cause the apparatus to monitor for the signals at a subcarrier spacing of 480 kHz or 960 kHz, and wherein adjacent monitoring occasions in the first or second set of monitoring occasions are in non-consecutive slots.

Aspect 41: An apparatus for wireless communication, comprising: a memory comprising executable instructions; and a processor coupled to the memory, the processor being configured to execute the executable instructions and cause the apparatus to: align a first set of monitoring occasions associated with a common search space (CSS) with a second set of monitoring occasions associated with a user equipment (UE)-specific search space (USS), transmit one or more signals via at least one of the CSS or the USS in the aligned first and second set of monitoring occasions, and communicate with a UE based on at least one of the signals in the aligned first and second set of monitoring occasions.

Aspect 42: The apparatus of Aspect 41, wherein to align the first set of monitoring occasions, the processor is further configured to execute the executable instructions and cause the apparatus to select one or more monitoring occasions from the first set of monitoring occasions that are aligned with the second set of monitoring occasions.

Aspect 43: The apparatus of Aspect 41 or 42, wherein: the processor is further configured to execute the executable instructions and cause the apparatus to transmit an indication of the second set of monitoring occasions associated with the USS; and wherein to align the first set of monitoring occasions, the processor is further configured to execute the executable instructions and cause the apparatus to align the first set of monitoring occasions in response to transmitting the indication of the second set of monitoring occasions associated with the USS.

Aspect 44: The apparatus according to any of Aspects 41-43, wherein to align the first set of monitoring occasions, the processor is further configured to execute the executable instructions and cause the apparatus to align the first set of monitoring occasions with the second set of monitoring occasions, if the USS and the CSS are in a same control resource set.

Aspect 45: The apparatus according to any of Aspects 41-44, wherein: the processor is further configured to execute the executable instructions and cause the apparatus to identify that the USS among a plurality of USSs in a plurality of control resource sets is in a same control resource set as the CSS; and wherein to align the first set of monitoring occasions, the processor is further configured to execute the executable instructions and cause the apparatus to align the first set of monitoring occasions with the second set of monitoring occasions based on the identification.

Aspect 46: The apparatus according to any of Aspects 41-45, wherein to align the first set of monitoring occasions, the processor is further configured to execute the executable instructions and cause the apparatus to align the first set of monitoring occasions with the second set of monitoring occasions that includes one or more monitoring occasions to skip.

Aspect 47: The apparatus according to any of Aspects 41-46, wherein to align the first set of monitoring occasions, the processor is further configured to execute the executable instructions and cause the apparatus to align at least one monitoring occasion from the first set of monitoring occasions with a monitoring occasion that will be skipped in the second set of monitoring occasions.

Aspect 48: The apparatus according to any of Aspects 41-47, wherein: the processor is further configured to execute the executable instructions and cause the apparatus to transmit a configuration indicating monitoring occasions for the CSS; and wherein to align the first set of monitoring occasions, the processor is further configured to execute the executable instructions and cause the apparatus to apply the indicated monitoring occasions as the first set of monitoring occasions that are aligned with the first set of monitoring occasions.

Aspect 49: The apparatus according to any of Aspects 41-48, wherein: the processor is further configured to execute the executable instructions and cause the apparatus to: transmit a configuration indicating monitoring occasions for the CSS, and identifying that at least one of the indicated monitoring occasions is misaligned with the second set of monitoring occasions; and wherein to align the first set of monitoring occasions, the processor is further configured to execute the executable instructions and cause the apparatus to: drop the at least one of the indicated monitoring occasions from the indicated monitoring occasions, and apply the remaining indicated monitoring occasions as the first set of monitoring occasions that are aligned with the first set of monitoring occasions.

Aspect 50: The apparatus according to any of Aspects 41-49, wherein: the processor is further configured to execute the executable instructions and cause the apparatus to: transmit a configuration indicating monitoring occasions for the CSS; identify that at least one of monitoring occasions from the second set of monitoring occasions is misaligned with the indicated monitoring occasions, and wherein to align the first set of monitoring occasions, the processor is further configured to execute the executable instructions and cause the apparatus to drop the at least one monitoring occasion from the second set of monitoring occasions.

Aspect 51: The apparatus according to any of Aspects 41-50, wherein to align the first set of monitoring occasions, the processor is further configured to execute the executable instructions and cause the apparatus to select one or more monitoring occasions from the first set of monitoring occasions that are aligned with the second set of monitoring occasions at a slot level.

Aspect 52: The apparatus according to any of Aspects 41-51, wherein to transmit the one or more signals, the processor is further configured to execute the executable instructions and cause the apparatus to transmit the one or more signals at a subcarrier spacing of 480 kHz or 960 kHz, and wherein adjacent monitoring occasions in the first or second set of monitoring occasions are in non-consecutive slots.

Aspect 53: An apparatus for wireless communication, comprising: a memory comprising executable instructions; and a processor coupled to the memory, the processor being configured to execute the executable instructions and cause the apparatus to: align a first set of monitoring occasions associated with a common search space (CSS) with a second set of monitoring occasions associated with a UE-specific search space (USS), monitor for signals from a network entity via at least one of the CSS or the USS in the aligned first and second set of monitoring occasions, and communicate with a network entity based on reception of at least one of the signals in the aligned first and second set of monitoring occasions.

Aspect 54: The apparatus of Aspect 53, wherein to align the first set of monitoring occasions, the processor is further configured to execute the executable instructions and cause the apparatus to select one or more monitoring occasions from the first set of monitoring occasions that are aligned with the second set of monitoring occasions.

Aspect 55: The apparatus of Aspect 53 or 54, wherein: the processor is further configured to execute the executable instructions and cause the apparatus to receive an indication of the second set of monitoring occasions associated with the USS; and to align the first set of monitoring occasions, the processor is further configured to execute the executable instructions and cause the apparatus to align the first set of monitoring occasions in response to receiving the indication of the second set of monitoring occasions associated with the USS.

Aspect 56: The apparatus of according to any of Aspects 53-55, wherein to align the first set of monitoring occasions, the processor is further configured to execute the executable instructions and cause the apparatus to align the first set of monitoring occasions with the second set of monitoring occasions, if the USS and the CSS are in a same control resource set.

Aspect 57: The apparatus according to any of Aspects 53-56, wherein: the processor is further configured to execute the executable instructions and cause the apparatus to identify that the USS among a plurality of USSs in a plurality of control resource sets is in a same control resource set as the CSS; and to align the first set of monitoring occasions, the processor is further configured to execute the executable instructions and cause the apparatus to align the first set of monitoring occasions with the second set of monitoring occasions based on the identification.

Aspect 58: The apparatus according to any of Aspects 53-57, wherein to align the first set of monitoring occasions, the processor is further configured to execute the executable instructions and cause the apparatus to align the first set of monitoring occasions with the second set of monitoring occasions that includes one or more monitoring occasions to skip.

Aspect 59: The apparatus according to any of Aspects 53-58, wherein to aligning the first set of monitoring occasions, the processor is further configured to execute the executable instructions and cause the apparatus to align at least one monitoring occasion from the first set of monitoring occasions with a monitoring occasion that will be skipped in the second set of monitoring occasions.

Aspect 60: The apparatus according to any of Aspects 53-59, wherein: the processor is further configured to execute the executable instructions and cause the apparatus to receive a configuration indicating monitoring occasions for the CSS; and to align the first set of monitoring occasions, the processor is further configured to execute the executable instructions and cause the apparatus to apply the indicated monitoring occasions as the first set of monitoring occasions that are aligned with the second set of monitoring occasions.

Aspect 61: The apparatus according to any of Aspect 53-60, wherein: the processor is further configured to execute the executable instructions and cause the apparatus to: receive a configuration indicating monitoring occasions for the CSS, and identify that at least one of the indicated monitoring occasions is misaligned with the second set of monitoring occasions; and wherein to align the first set of monitoring occasions, the processor is further configured to execute the executable instructions and cause the apparatus to: drop the at least one of the indicated monitoring occasions from the indicated monitoring occasions, and apply the remaining indicated monitoring occasions as the first set of monitoring occasions that are aligned with the second set of monitoring occasions.

Aspect 62: The apparatus according to any of Aspects 53-61, wherein: the processor is further configured to execute the executable instructions and cause the apparatus to: receive a configuration indicating monitoring occasions for the CSS, and identify that at least one of monitoring occasions from the second set of monitoring occasions is misaligned with the indicated monitoring occasions; and wherein to align the first set of monitoring occasions, the processor is further configured to execute the executable instructions and cause the apparatus to drop the at least one monitoring occasion from the second set of monitoring occasions.

Aspect 63: The apparatus according to any of Aspects 53-62, wherein to align the first set of monitoring occasions, the processor is further configured to execute the executable instructions and cause the apparatus to select one or more monitoring occasions from the first set of monitoring occasions that are aligned with the second set of monitoring occasions at a slot level.

Aspect 64: The apparatus according to any of Aspects 53-63, wherein to monitor for signals, the processor is further configured to execute the executable instructions and cause the apparatus to monitor for the signals at a subcarrier spacing of 480 kHz or 960 kHz, and wherein adjacent monitoring occasions in the first or second set of monitoring occasions are in non-consecutive slots.

Aspect 65: An apparatus for wireless communication, comprising: a memory comprising executable instructions; and a processor coupled to the memory, the processor being configured to execute the executable instructions and cause the apparatus to: align a first set of monitoring occasions associated with a common search space (CSS) with a second set of monitoring occasions associated with a user equipment (UE)-specific search space (USS), transmit one or more signals via at least one of the CSS or the USS in the aligned first and second set of monitoring occasions, and communicate with a UE based on at least one of the signals in the aligned first and second set of monitoring occasions.

Aspect 66: The apparatus of Aspect 65, wherein to align the first set of monitoring occasions, the processor is further configured to execute the executable instructions and cause the apparatus to select one or more monitoring occasions from the first set of monitoring occasions that are aligned with the second set of monitoring occasions.

Aspect 67: The apparatus of Aspect 65 or 66, wherein: the processor is further configured to execute the executable instructions and cause the apparatus to transmit an indication of the second set of monitoring occasions associated with the USS; and wherein to align the first set of monitoring occasions, the processor is further configured to execute the executable instructions and cause the apparatus to align the first set of monitoring occasions in response to transmitting the indication of the second set of monitoring occasions associated with the USS.

Aspect 68: The apparatus according to any of Aspects 65-67, wherein to align the first set of monitoring occasions, the processor is further configured to execute the executable instructions and cause the apparatus to align the first set of monitoring occasions with the second set of monitoring occasions, if the USS and the CSS are in a same control resource set.

Aspect 69: The apparatus according to any of Aspects 65-68, wherein: the processor is further configured to execute the executable instructions and cause the apparatus to identify that the USS among a plurality of USSs in a plurality of control resource sets is in a same control resource set as the CSS; and wherein to align the first set of monitoring occasions, the processor is further configured to execute the executable instructions and cause the apparatus to align the first set of monitoring occasions with the second set of monitoring occasions based on the identification.

Aspect 70: The apparatus according to any of Aspects 65-69, wherein to align the first set of monitoring occasions, the processor is further configured to execute the executable instructions and cause the apparatus to align the first set of monitoring occasions with the second set of monitoring occasions that includes one or more monitoring occasions to skip.

Aspect 71: The apparatus according to any of Aspects 65-70, wherein to align the first set of monitoring occasions, the processor is further configured to execute the executable instructions and cause the apparatus to align at least one monitoring occasion from the first set of monitoring occasions with a monitoring occasion that will be skipped in the second set of monitoring occasions.

Aspect 72: The apparatus according to any of Aspects 65-71, wherein: the processor is further configured to execute the executable instructions and cause the apparatus to transmit a configuration indicating monitoring occasions for the CSS; and wherein to align the first set of monitoring occasions, the processor is further configured to execute the executable instructions and cause the apparatus to apply the indicated monitoring occasions as the first set of monitoring occasions that are aligned with the first set of monitoring occasions.

Aspect 73: The apparatus according to any of Aspects 65-72, wherein: the processor is further configured to execute the executable instructions and cause the apparatus to: transmit a configuration indicating monitoring occasions for the CSS, and identifying that at least one of the indicated monitoring occasions is misaligned with the second set of monitoring occasions; and wherein to align the first set of monitoring occasions, the processor is further configured to execute the executable instructions and cause the apparatus to: drop the at least one of the indicated monitoring occasions from the indicated monitoring occasions, and apply the remaining indicated monitoring occasions as the first set of monitoring occasions that are aligned with the first set of monitoring occasions.

Aspect 74: The apparatus according to any of Aspects 65-73, wherein: the processor is further configured to execute the executable instructions and cause the apparatus to: transmit a configuration indicating monitoring occasions for the CSS; identify that at least one of monitoring occasions from the second set of monitoring occasions is misaligned with the indicated monitoring occasions, and wherein to align the first set of monitoring occasions, the processor is further configured to execute the executable instructions and cause the apparatus to drop the at least one monitoring occasion from the second set of monitoring occasions.

Aspect 75: The apparatus according to any of Aspects 65-74, wherein to align the first set of monitoring occasions, the processor is further configured to execute the executable instructions and cause the apparatus to select one or more monitoring occasions from the first set of monitoring occasions that are aligned with the second set of monitoring occasions at a slot level.

Aspect 76: The apparatus according to any of Aspects 65-75, wherein to transmit the one or more signals, the processor is further configured to execute the executable instructions and cause the apparatus to transmit the one or more signals at a subcarrier spacing of 480 kHz or 960 kHz, and wherein adjacent monitoring occasions in the first or second set of monitoring occasions are in non-consecutive slots.

Aspect 77: A method of wireless communication by a user equipment (UE), comprising: aligning a first set of monitoring occasions associated with a common search space (CSS) with a second set of monitoring occasions associated with a UE-specific search space (USS); monitoring for signals from a network entity via at least one of the CSS or the USS in the aligned first and second set of monitoring occasions; and communicating with a network entity based on reception of at least one of the signals in the aligned first and second set of monitoring occasions.

Aspect 78: The method of Aspect 77, further comprising: receiving an indication of the second set of monitoring occasions associated with the USS; and wherein aligning the first set of monitoring occasions comprises aligning the first set of monitoring occasions in response to receiving the indication of the second set of monitoring occasions associated with the USS.

Aspect 79: The method of Aspect 77 or 78, further comprising: receiving a configuration indicating monitoring occasions for the CSS; and wherein aligning the first set of monitoring occasions comprises applying the indicated monitoring occasions as the first set of monitoring occasions that are aligned with the second set of monitoring occasions.

Aspect 80: A method of wireless communication by a network entity, comprising: aligning a first set of monitoring occasions associated with a common search space (CSS) with a second set of monitoring occasions associated with a user equipment (UE)-specific search space (USS); transmitting one or more signals via at least one of the CSS or the USS in the aligned first and second set of monitoring occasions; and communicating with a UE based on at least one of the signals in the aligned first and second set of monitoring occasions.

Aspect 81: The method of Aspect 80, further comprising: transmitting an indication of the second set of monitoring occasions associated with the USS; and wherein aligning the first set of monitoring occasions comprises aligning the first set of monitoring occasions in response to transmitting the indication of the second set of monitoring occasions associated with the USS.

Aspect 82: The method of Aspect 80 or 81, further comprising: transmitting a configuration indicating monitoring occasions for the CSS; and wherein aligning the first set of monitoring occasions comprises applying the indicated monitoring occasions as the first set of monitoring occasions that are aligned with the first set of monitoring occasions.

Aspect 83: An apparatus, comprising: a memory comprising executable instructions; one or more processors configured to execute the executable instructions and cause the apparatus to perform a method in accordance with any of Aspects 1-28 or 77-82.

Aspect 84: An apparatus, comprising means for performing a method in accordance with any of Aspects 1-28 or 77-82.

Aspect 85: A computer-readable medium comprising executable instructions that, when executed by one or more processors of an apparatus, cause the apparatus to perform a method in accordance with any of Aspects 1-28 or 77-82.

Aspect 86: A computer program product embodied on a computer-readable storage medium comprising code for performing a method in accordance with any of Aspects 1-28 or 77-82.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6 and/or FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. An apparatus for wireless communication, comprising:
   memory comprising executable instructions; and
   one or more processors coupled to the memory, the one or more processors being configured, individually or collectively, to execute the executable instructions and cause the apparatus to:
      receive an indication of a second set of monitoring occasions associated with a user equipment (UE)-specific search space (USS),
      align, in response to receiving the indication of the second set of monitoring occasions associated with the USS, a first set of monitoring occasions associated with a common search space (CSS) with the second set of monitoring occasions associated with the USS,
      monitor for signals from a network entity via at least one of the CSS or the USS in the aligned first and second set of monitoring occasions, and
      communicate with a network entity based on reception of at least one of the signals in the aligned first and second set of monitoring occasions.

2. The apparatus of claim 1, wherein to align the first set of monitoring occasions, the one or more processors are further configured, individually or collectively, to execute the executable instructions and cause the apparatus to select one or more monitoring occasions from the first set of monitoring occasions that are aligned with the second set of monitoring occasions.

3. The apparatus of claim 1, wherein:
   the one or more processors are further configured, individually or collectively, to execute the executable instructions and cause the apparatus to identify that the USS among a plurality of USSs in a plurality of control resource sets is in a same control resource set as the CSS; and
   to align the first set of monitoring occasions, the one or more processors are further configured, individually or collectively, to execute the executable instructions and cause the apparatus to align the first set of monitoring occasions with the second set of monitoring occasions based on the identification.

4. The apparatus of claim 1, wherein to align the first set of monitoring occasions, the one or more processors are further configured, individually or collectively, to execute the executable instructions and cause the apparatus to align the first set of monitoring occasions with the second set of monitoring occasions that includes one or more monitoring occasions to skip.

5. The apparatus of claim 1, wherein to align the first set of monitoring occasions, the one or more processors are further configured, individually or collectively, to execute the executable instructions and cause the apparatus to align at least one monitoring occasion from the first set of monitoring occasions with a monitoring occasion that will be skipped in the second set of monitoring occasions.

6. The apparatus of claim 1, wherein:
   the one or more processors are further configured, individually or collectively, to execute the executable instructions and cause the apparatus to receive a configuration indicating monitoring occasions for the CSS; and to align the first set of monitoring occasions, the one or more processors are further configured, individually or collectively, to execute the executable instructions and cause the apparatus to apply the indicated monitoring occasions as the first set of monitoring occasions that are aligned with the second set of monitoring occasions.

7. The apparatus of claim 1, wherein:
the one or more processors are further configured, individually or collectively, to execute the executable instructions and cause the apparatus to:
receive a configuration indicating monitoring occasions for the CSS, and
identify that at least one of the indicated monitoring occasions is misaligned with the second set of monitoring occasions; and
wherein to align the first set of monitoring occasions, the one or more processors are further configured, individually or collectively, to execute the executable instructions and cause the apparatus to:
drop the at least one of the indicated monitoring occasions from the indicated monitoring occasions, and
apply a remaining indicated monitoring occasions as the first set of monitoring occasions that are aligned with the second set of monitoring occasions.

8. The apparatus of claim 1, wherein:
the one or more processors are further configured, individually or collectively, to execute the executable instructions and cause the apparatus to:
receive a configuration indicating monitoring occasions for the CSS, and
identify that at least one monitoring occasion from the second set of monitoring occasions is misaligned with the indicated monitoring occasions; and
wherein to align the first set of monitoring occasions, the one or more processors are further configured, individually or collectively, to execute the executable instructions and cause the apparatus to drop the at least one monitoring occasion from the second set of monitoring occasions.

9. The apparatus of claim 1, wherein to align the first set of monitoring occasions, the one or more processors are further configured, individually or collectively, to execute the executable instructions and cause the apparatus to select one or more monitoring occasions from the first set of monitoring occasions that are aligned with the second set of monitoring occasions at a slot level.

10. The apparatus of claim 1, wherein to monitor for signals, the one or more processors are further configured, individually or collectively, to execute the executable instructions and cause the apparatus to monitor for the signals at a subcarrier spacing of 480 kHz or 960 kHz, and wherein adjacent monitoring occasions in the first or second set of monitoring occasions are in non-consecutive slots.

11. An apparatus for wireless communication, comprising:
memory comprising executable instructions; and
one or more processors coupled to the memory, the one or more processors being configured, individually or collectively, to execute the executable instructions and cause the apparatus to:
transmit an indication of a second set of monitoring occasions associated with a user equipment (UE)-specific search space (USS),
align, in response to transmitting the indication of the second set of monitoring occasions associated with the USS, a first set of monitoring occasions associated with a common search space (CSS) with the second set of monitoring occasions associated with the USS,
transmit one or more signals via at least one of the CSS or the USS in the aligned first and second set of monitoring occasions, and
communicate with a UE based on at least one of the signals in the aligned first and second set of monitoring occasions.

12. The apparatus of claim 11, wherein to align the first set of monitoring occasions, the one or more processors are further configured, individually or collectively, to execute the executable instructions and cause the apparatus to select one or more monitoring occasions from the first set of monitoring occasions that are aligned with the second set of monitoring occasions.

13. The apparatus of claim 11, wherein:
the one or more processors are further configured, individually or collectively, to execute the executable instructions and cause the apparatus to identify that the USS among a plurality of USSs in a plurality of control resource sets is in a same control resource set as the CSS; and
wherein to align the first set of monitoring occasions, the one or more processors are further configured, individually or collectively, to execute the executable instructions and cause the apparatus to align the first set of monitoring occasions with the second set of monitoring occasions based on the identification.

14. The apparatus of claim 11, wherein to align the first set of monitoring occasions, the one or more processors are further configured, individually or collectively, to execute the executable instructions and cause the apparatus to align the first set of monitoring occasions with the second set of monitoring occasions that includes one or more monitoring occasions to skip.

15. The apparatus of claim 11, wherein to align the first set of monitoring occasions, the one or more processors are further configured, individually or collectively, to execute the executable instructions and cause the apparatus to align at least one monitoring occasion from the first set of monitoring occasions with a monitoring occasion that will be skipped in the second set of monitoring occasions.

16. The apparatus of claim 11, wherein:
the one or more processors are further configured, individually or collectively, to execute the executable instructions and cause the apparatus to transmit a configuration indicating monitoring occasions for the CSS; and
wherein to align the first set of monitoring occasions, the one or more processors are further configured, individually or collectively, to execute the executable instructions and cause the apparatus to apply the indicated monitoring occasions as the first set of monitoring occasions that are aligned with the second set of monitoring occasions.

17. The apparatus of claim 11, wherein:
the one or more processors are further configured, individually or collectively, to execute the executable instructions and cause the apparatus to:

transmit a configuration indicating monitoring occasions for the CSS, and identifying that at least one of the indicated monitoring occasions is misaligned with the second set of monitoring occasions; and wherein to align the first set of monitoring occasions, the one or more processors are further configured, individually or collectively, to execute the executable instructions and cause the apparatus to:

drop the at least one of the indicated monitoring occasions from the indicated monitoring occasions, and apply a remaining indicated monitoring occasions as the first set of monitoring occasions that are aligned with the first set of monitoring occasions.

18. The apparatus of claim 11, wherein:

the one or more processors are further configured, individually or collectively, to execute the executable instructions and cause the apparatus to:

transmit a configuration indicating monitoring occasions for the CSS; and identify that at least one monitoring occasion from the second set of monitoring occasions is misaligned with the indicated monitoring occasions, and wherein to align the first set of monitoring occasions, the one or more processors are further configured, individually or collectively, to execute the executable instructions and cause the apparatus to drop the at least one monitoring occasion from the second set of monitoring occasions.

19. The apparatus of claim 11, wherein to align the first set of monitoring occasions, the one or more processors are further configured, individually or collectively, to execute the executable instructions and cause the apparatus to select one or more monitoring occasions from the first set of monitoring occasions that are aligned with the second set of monitoring occasions at a slot level.

20. The apparatus of claim 11, wherein to transmit the one or more signals, the one or more processors are further configured, individually or collectively, to execute the executable instructions and cause the apparatus to transmit the one or more signals at a subcarrier spacing of 480 kHz or 960 kHz, and wherein adjacent monitoring occasions in the first or second set of monitoring occasions are in non-consecutive slots.

21. A method of wireless communication by a user equipment (UE), comprising:

receiving an indication of a second set of monitoring occasions associated with a UE-specific search space (USS), aligning, in response to receiving the indication of the second set of monitoring occasions associated with the USS, a first set of monitoring occasions associated with a common search space (CSS) with a second set of monitoring occasions associated with the USS;

monitoring for signals from a network entity via at least one of the CSS or the USS in the aligned first and second set of monitoring occasions; and communicating with a network entity based on reception of at least one of the signals in the aligned first and second set of monitoring occasions.

22. The method of claim 21, further comprising:

receiving a configuration indicating monitoring occasions for the CSS; and wherein aligning the first set of monitoring occasions comprises applying the indicated monitoring occasions as the first set of monitoring occasions that are aligned with the second set of monitoring occasions.

23. The method of claim 21, wherein aligning the first set of monitoring occasions comprises aligning the first set of monitoring occasions with the second set of monitoring occasions that includes one or more monitoring occasions to skip.

24. A method of wireless communication by a network entity, comprising:

transmitting an indication of a second set of monitoring occasions associated with a user equipment (UE)-specific search space (USS), aligning, in response to transmitting the indication of the second set of monitoring occasions associated with the USS, a first set of monitoring occasions associated with a common search space (CSS) with a second set of monitoring occasions associated with the USS;

transmitting one or more signals via at least one of the CSS or the USS in the aligned first and second set of monitoring occasions; and communicating with a UE based on at least one of the signals in the aligned first and second set of monitoring occasions.

25. The method of claim 24, further comprising:

transmitting a configuration indicating monitoring occasions for the CSS; and wherein aligning the first set of monitoring occasions comprises applying the indicated monitoring occasions as the first set of monitoring occasions that are aligned with the second set of monitoring occasions.

26. The method of claim 24, wherein aligning the first set of monitoring occasions comprises aligning the first set of monitoring occasions with the second set of monitoring occasions that includes one or more monitoring occasions to skip.

27. An apparatus for wireless communication, comprising:

memory comprising executable instructions; and one or more processors coupled to the memory, the one or more processors being configured, individually or collectively, to execute the executable instructions and cause the apparatus to:

identify that a user equipment (UE)-specific search space (USS) among a plurality of USSs in a plurality of control resource sets is in a same control resource set as a common search space (CSS), align, based on the identification, a first set of monitoring occasions associated with the CSS with a second set of monitoring occasions associated with the USS, monitor for signals from a network entity via at least one of the CSS or the USS in the aligned first and second set of monitoring occasions, and communicate with a network entity based on reception of at least one of the signals in the aligned first and second set of monitoring occasions.

28. The apparatus of claim 27, wherein:

the one or more processors are further configured, individually or collectively, to execute the executable instructions and cause the apparatus to receive an indication of the second set of monitoring occasions associated with the USS; and to align the first set of monitoring occasions, the one or more processors are further configured, individually or collectively, to execute the executable instructions and cause the apparatus to align the first set of monitoring occasions in response to receiving the indication of the second set of monitoring occasions associated with the USS.

29. An apparatus for wireless communication, comprising:

memory comprising executable instructions; and one or more processors coupled to the memory, the one or more processors being configured, individually or collectively, to execute the executable instructions and cause the apparatus to:

identify that a user equipment (UE)-specific search space (USS) among a plurality of USSs in a plurality of control resource sets is in a same control resource set as a common search space (CSS), align, based on the identification, a first set of monitoring occasions associated with the CSS with a second set of monitoring occasions associated with the USS, transmit one or more signals via at least one of the CSS or the USS in the aligned first and second set of monitoring occasions, and communicate with a UE based on at least one of the signals in the aligned first and second set of monitoring occasions.

30. The apparatus of claim 29, wherein:

the one or more processors are further configured, individually or collectively, to execute the executable instructions and cause the apparatus to transmit an indication of the second set of monitoring occasions associated with the USS; and wherein to align the first set of monitoring occasions, the one or more processors are further configured, individually or collectively, to execute the executable instructions and cause the apparatus to align the first set of monitoring occasions in response to transmitting the indication of the second set of monitoring occasions associated with the USS.

* * * * *